US012623365B2

(12) United States Patent
Claus et al.

(10) Patent No.: US 12,623,365 B2
(45) Date of Patent: May 12, 2026

(54) RAZOR CARTRIDGE WITH ONE OR MORE SKIN SUPPORT ELEMENTS

(71) Applicant: The Gillette Company LLC, Boston, MA (US)

(72) Inventors: Oliver Heinz Claus, Walpole, MA (US); Vincent Paul Walker, Jr., Bridgewater, MA (US); Regan Marie Fiascone, Cambridge, MA (US)

(73) Assignee: The Gillette Company LLC, Boston, MA (US)

(*) Notice: Subject to any disclaimer, the term of this patent is extended or adjusted under 35 U.S.C. 154(b) by 0 days.

(21) Appl. No.: 18/677,133

(22) Filed: May 29, 2024

(65) Prior Publication Data

US 2024/0308093 A1 Sep. 19, 2024

Related U.S. Application Data

(62) Division of application No. 16/907,987, filed on Jun. 22, 2020, now Pat. No. 12,023,821.

(60) Provisional application No. 62/864,734, filed on Jun. 21, 2019.

(51) Int. Cl.

| | |
|---|---|
| ***B26B 21/40*** | (2006.01) |
| ***B26B 21/22*** | (2006.01) |
| ***B26B 21/44*** | (2006.01) |

(52) U.S. Cl.

CPC ........ *B26B 21/4018* (2013.01); *B26B 21/222* (2013.01); *B26B 21/4031* (2013.01); *B26B 21/443* (2013.01)

(58) Field of Classification Search

CPC ......... B26B 21/00; B26B 21/02; B26B 21/14; B26B 21/16; B26B 21/22; B26B 21/40; B26B 21/4006; B26B 21/4018; B26B 21/4037

USPC ........................................... 30/47–51, 77, 78

See application file for complete search history.

(56) References Cited

U.S. PATENT DOCUMENTS

| | | | |
|---|---|---|---|
| 5,369,885 | A | 12/1994 | Ferraro |
| 5,802,721 | A | 9/1998 | Wain et al. |
| 7,681,314 | B2 | 3/2010 | Follo |
| 9,015,951 | B2 | 4/2015 | Howell et al. |

(Continued)

FOREIGN PATENT DOCUMENTS

| | | | |
|---|---|---|---|
| CN | 1649701 | A | 8/2005 |
| CN | 1929968 | A | 3/2007 |

(Continued)

OTHER PUBLICATIONS

Extended European Search Report and Search Opinion; Application No. 22206375.2; dated Apr. 19, 2023, 07 pages.

(Continued)

*Primary Examiner* — Jason Daniel Prone

(74) *Attorney, Agent, or Firm* — John M. Lipchitz

(57) ABSTRACT

A razor cartridge including a housing; a trailing blade assembly mounted to the housing and including a trailing blade with a blade tip; a leading blade assembly mounted to the housing in front of the trailing blade assembly and including a leading blade with a blade tip; and a skin support element affixed to the leading blade assembly and extending towards the blade tip of the trailing blade assembly. A horizontal length of the skin support element may be greater than a distance from a trailing part of the skin support element to the blade tip of the trailing blade assembly.

14 Claims, 10 Drawing Sheets

(56) References Cited

U.S. PATENT DOCUMENTS

| | | | | |
|---|---|---|---|---|
| 9,032,628 | B2 | 5/2015 | Hobson, Sr. et al. | |
| 9,149,944 | B2 * | 10/2015 | Hobson, Sr. | B26B 21/4068 |
| 9,925,678 | B2 * | 3/2018 | Nicholas | B26B 21/4037 |
| 10,500,744 | B1 | 12/2019 | Dryfhout | |
| 11,000,960 | B1 | 5/2021 | Hooberman | |
| 11,117,278 | B2 | 9/2021 | Walker, Jr. | |
| 11,117,280 | B2 | 9/2021 | Zucker | |
| 11,780,106 | B2 * | 10/2023 | Schizas | B26B 21/44 30/50 |
| 12,023,821 | B2 | 7/2024 | Claus | |
| 2001/0013174 | A1 | 8/2001 | Zucker | |
| 2002/0144404 | A1 | 10/2002 | Gilder et al. | |
| 2003/0204955 | A1 | 11/2003 | Gilder et al. | |
| 2010/0218381 | A1 | 9/2010 | Follo | |
| 2011/0225828 | A1 | 9/2011 | Bruno | |
| 2012/0317818 | A1 | 12/2012 | Oglesby et al. | |
| 2014/0000082 | A1 | 1/2014 | Xu | |
| 2019/0016001 | A1 | 1/2019 | Zucker | |
| 2021/0154871 | A1 | 5/2021 | Kanakaris et al. | |
| 2021/0370535 | A1 | 12/2021 | Zucker | |
| 2022/0193939 | A1 | 6/2022 | Galanis et al. | |
| 2022/0314477 | A1 | 10/2022 | Galanis et al. | |
| 2023/0166418 | A1 * | 6/2023 | Park | B26B 21/22 30/50 |
| 2023/0182335 | A1 * | 6/2023 | Wang | B26B 21/4018 30/32 |
| 2024/0009873 | A1 * | 1/2024 | Soliman | B26B 21/22 |
| 2024/0123643 | A1 * | 4/2024 | Karakalas | B26B 21/40 |
| 2024/0157591 | A1 * | 5/2024 | Blatter | B26B 21/4037 |
| 2024/0342937 | A1 * | 10/2024 | Chrysanthakopoulos | B26B 21/4018 |
| 2024/0416541 | A1 * | 12/2024 | Nakada | B26B 21/14 |
| 2025/0050520 | A1 * | 2/2025 | Loughlin | B26B 21/4018 |

FOREIGN PATENT DOCUMENTS

| | | | | |
|---|---|---|---|---|
| CN | 1929971 | A | 3/2007 | |
| CN | 102421573 | A | 4/2012 | |
| CN | 103608153 | A | 2/2014 | |
| CN | 103619548 | A | 3/2014 | |
| CN | 105339142 | A | 2/2016 | |
| CN | 208592872 | U | 3/2019 | |
| CN | 114080305 | A * | 2/2022 | B26B 21/40 |
| EP | 0073852 | A2 | 3/1983 | |
| EP | 4151378 | A1 * | 3/2023 | B26B 21/40 |
| WO | 9509071 | A1 | 4/1995 | |
| WO | WO-2020257435 | A1 * | 12/2020 | B26B 21/40 |

OTHER PUBLICATIONS

Extended EP Search Report and Written Opinion for 22206377.8 dated Feb. 20, 2023, 05 pages.

International Search Report and Written Opinion; Application No. US2020/038404; dated Sep. 18, 2020; 11 pages.

EPO Search Report and Opinion for 25181122.0 dated Oct. 13, 2025, 11 pages.

* cited by examiner

RAZOR CARTRIDGE WITH ONE OR MORE SKIN SUPPORT ELEMENTS

CROSS REFERENCE TO RELATED APPLICATIONS

This application is a divisional of, and claims priority under 35 U.S.C. § 120 to, U.S. patent application Ser. No. 16/907,987, filed on Jun. 22, 2020, which is now U.S. Pat. No. 12,023,821, which claims the benefit under 35 USC § 119(e), to U.S. Provisional Patent Application Ser. Nos. 62/864,734, filed on Jun. 21, 2019, the entire disclosures of which are hereby incorporated by reference herein.

FIELD OF THE INVENTION

The invention generally relates to shaving razors and more particularly to shaving razor cartridges having a skin support element disposed between the blades.

BACKGROUND OF THE INVENTION

In general, shaving razors of the wet shave type include a cartridge or blade unit with at least one blade with a cutting edge, which is moved across the surface of the skin being shaved by means of a handle to which the cartridge is attached. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled (i.e., disposable razor). The connection of the cartridge to the handle provides a pivotal mounting of the cartridge with respect to the handle so that the cartridge angle adjusts to follow the contours of the surface being shaved. In such systems, the cartridge can be biased toward a rest position by the action of a spring-biased plunger (a cam follower) carried on the handle against a cam surface on the cartridge housing.

Razor cartridges usually include a guard that contacts the skin in front of the blade(s) and a cap for contacting the skin behind the blade(s) during shaving. The cap and the guard aid in establishing the so-called "shaving geometry", i.e., the parameters which determine the blade orientation and position relative to the skin during shaving, which in turn have a strong influence on the shaving performance and efficacy of the razor. The cap and the guard may aid in establishing the exposure of the blades. The blade exposure is defined to be the perpendicular distance or height of the blade edge measured with respect to a plane tangential to the skin contacting surfaces of the blade unit elements next in front of and next behind the edge. Therefore, for a three-bladed blade unit, the exposure of the first or primary blade is measured with reference to a plane tangential to the guard and the edge of the second blade, and the exposure of the third or tertiary blade is measured with reference to a plane tangential to the edge of the second blade and the cap.

Safety razors having cartridges with several blades have in recent years been sold in very large numbers and are generally acknowledged to give a better quality of shave, especially in terms of closeness, than single bladed razors. A blade unit having many blades can produce a closer shave than a similar blade unit with only one or two blades. However, closeness of shave obtained is only one parameter by which razor users judge the performance of a razor. Comfort is another important characteristic to consider. For example, many consumers describe themselves as having sensitive skin, which is prone to nicks, cuts and irritation. Discomfort during a shave, often described by shavers as a "pull & tug" sensation, is caused by the nerves around the follicle being stimulated. This nerve stimulation can happen by moving the hairs, pulling and/or cutting the hairs, and by dragging the razor cartridge over the surface of the skin.

Additionally, many consumers suffer from acne and/or pseudofolliculitis barbae (PFB) that make shaving uncomfortable. PFB or shaving bumps is a foreign body inflammatory reaction involving papules and pustules. It is a common dermatologic condition principally affecting adult men who have naturally coarse or tightly curling hair, particularly those who shave closely on a regular basis. The leading edge of closely cropped facial hair re-entering the epidermis of the skin or transecting the wall of the hair follicle results in localized inflammatory reactions over the affected site. The process can lead to secondary skin infections and, in severe cases, permanent scarring. Accordingly, what is needed is a shaving razor cartridge that provides a more comfortable shave and/or decreases skin issues caused by shaving the face and body (e.g., PFB, irritation, redness, razor bumps, ingrown hairs, acne, etc.).

SUMMARY OF THE INVENTION

In accordance with an aspect of the present disclosure, a razor cartridge is provided that includes a housing; a trailing blade assembly mounted to the housing, the trailing blade assembly including a trailing blade with a blade tip; a leading blade assembly mounted to the housing in front of the trailing blade assembly, the leading blade assembly including a leading blade with a blade tip; and a skin support element affixed to the leading blade assembly and extending towards the blade tip of the trailing blade assembly. A horizontal length of the skin support element may be greater than a distance from a trailing part of the skin support element to the blade tip of the trailing blade assembly.

In accordance with another aspect of the present disclosure, a razor cartridge is provided that includes a housing; a trailing blade assembly mounted in the housing, the trailing blade assembly including a trailing blade with a blade tip; a leading blade assembly mounted to the housing in front of the trailing blade assembly, the leading blade assembly including a leading blade with a blade tip; and a skin support element affixed to the leading blade assembly and extending towards the blade tip of the trailing blade assembly. The skin support element may have a plurality of openings.

In accordance with a further aspect of the present disclosure, a razor cartridge is provided that includes a housing; a trailing blade assembly mounted in the housing, the trailing blade assembly including a trailing blade with a blade tip; a leading blade assembly mounted to the housing in front of the trailing blade assembly, the leading blade assembly including a leading blade with a blade tip and a leading blade support, in which the leading blade is coupled to the leading blade support member; and a skin support element affixed to the leading blade assembly and extending towards the blade tip of the trailing blade assembly. The skin support element may have a trailing part that is spaced apart from the leading blade support member.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Figure 1:
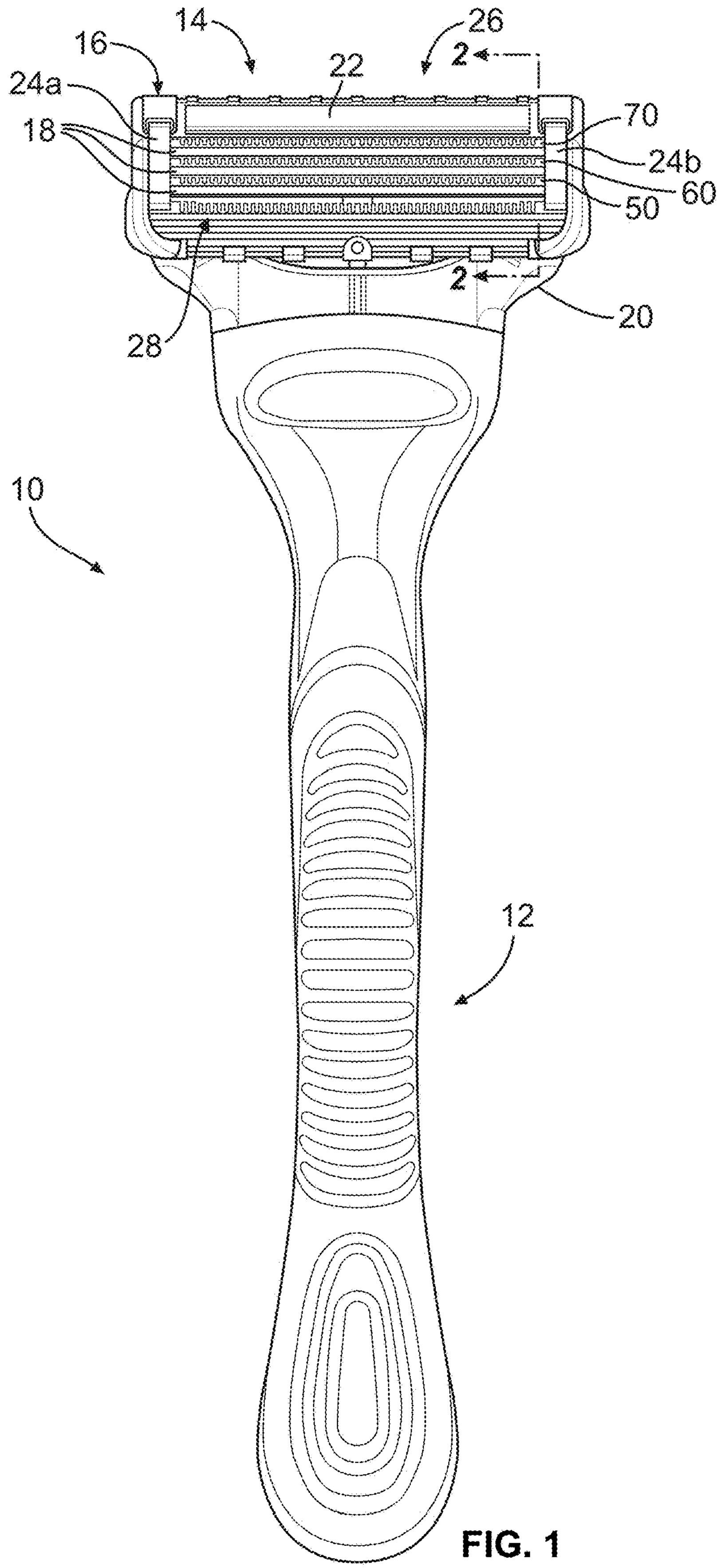
FIG. 1 is a front view of a razor system comprising a handle and a razor cartridge in accordance with a first aspect of the present disclosure.
Figure 2:
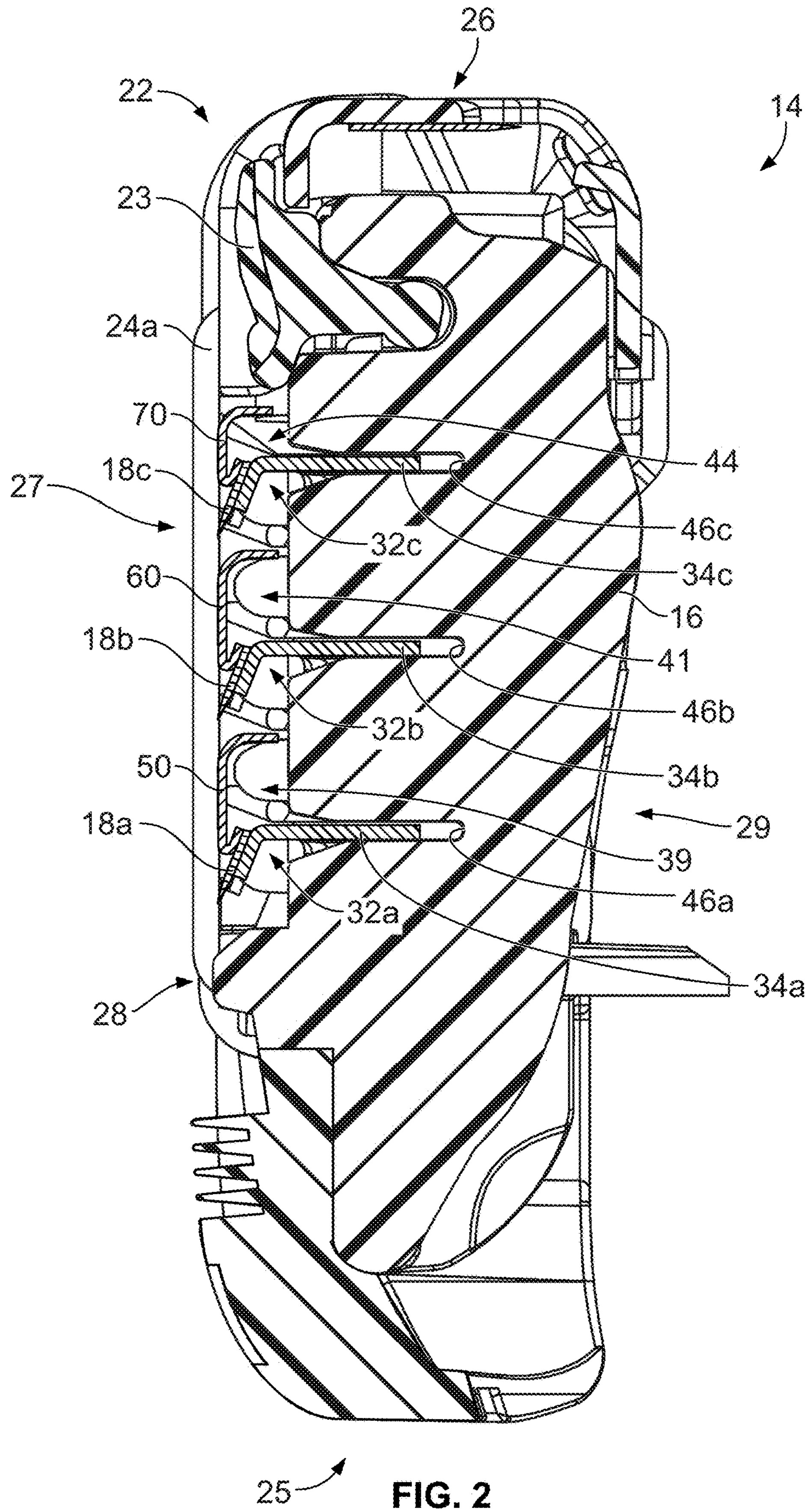
FIG. 2 is a cross-sectional view taken along line 2-2 in FIG. 1 of the razor cartridge of FIG. 1.

With reference to FIGS. 1 and 2, a shaving razor system 10 comprises a handle 12 and a razor cartridge 14. In some examples, the razor cartridge 14 may be detachably mounted to the handle 12 with a connector 20, and in other examples, the razor cartridge 14 may be attached permanently to the handle 12. The razor cartridge 14 may pivot relative to the handle 12. The razor cartridge 14 may include a cartridge housing 16 having one or more blades 18, each comprising part of a blade assembly as discussed further below. Although three blades are shown in FIG. 1, it is understood that any number of blades, more or less, may be mounted within the razor cartridge 14. The blade assemblies may be mounted within the cartridge housing 16 and secured with clips 24*a* and 24*b* as shown. The cartridge housing 16 may comprise a front 25, a back 26, a top 27, and a bottom 29. As used herein, the terms "front/forward," "back/rear," "horizontal," and derivatives thereof may refer to an orientation or direction with respect to the front 25 and back 26, respectively, of the cartridge housing 16, and the terms "top/up," "bottom/down," "vertical," and derivatives thereof may refer to an orientation or direction with respect to the top 27 and bottom 29, respectively, of the cartridge housing 16. The cartridge housing 16 may further comprise a cap 22 located near the back 26 of the cartridge housing 16 and one or more guard structures 28 located near the front 25 of the cartridge housing 16. The cap 22 may comprise one or more lubrication members 23. The one or more guard structures 28 may be positioned in front of the blades 18 and may be joined to or integral with the cartridge housing 16.

Figure 3:
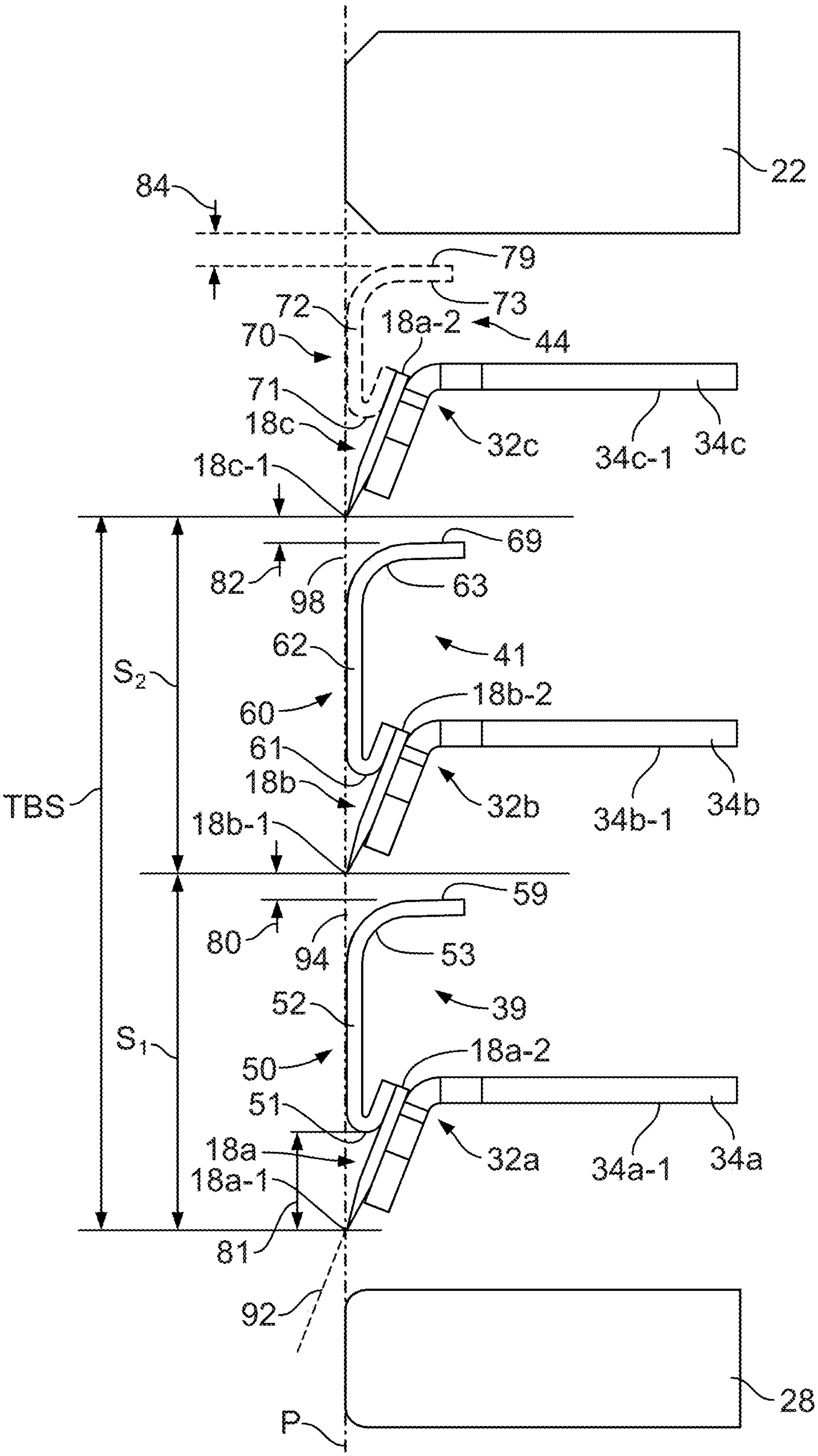
FIG. 3 is a schematic view of the razor cartridge of FIG. 2.
Figure 4A:
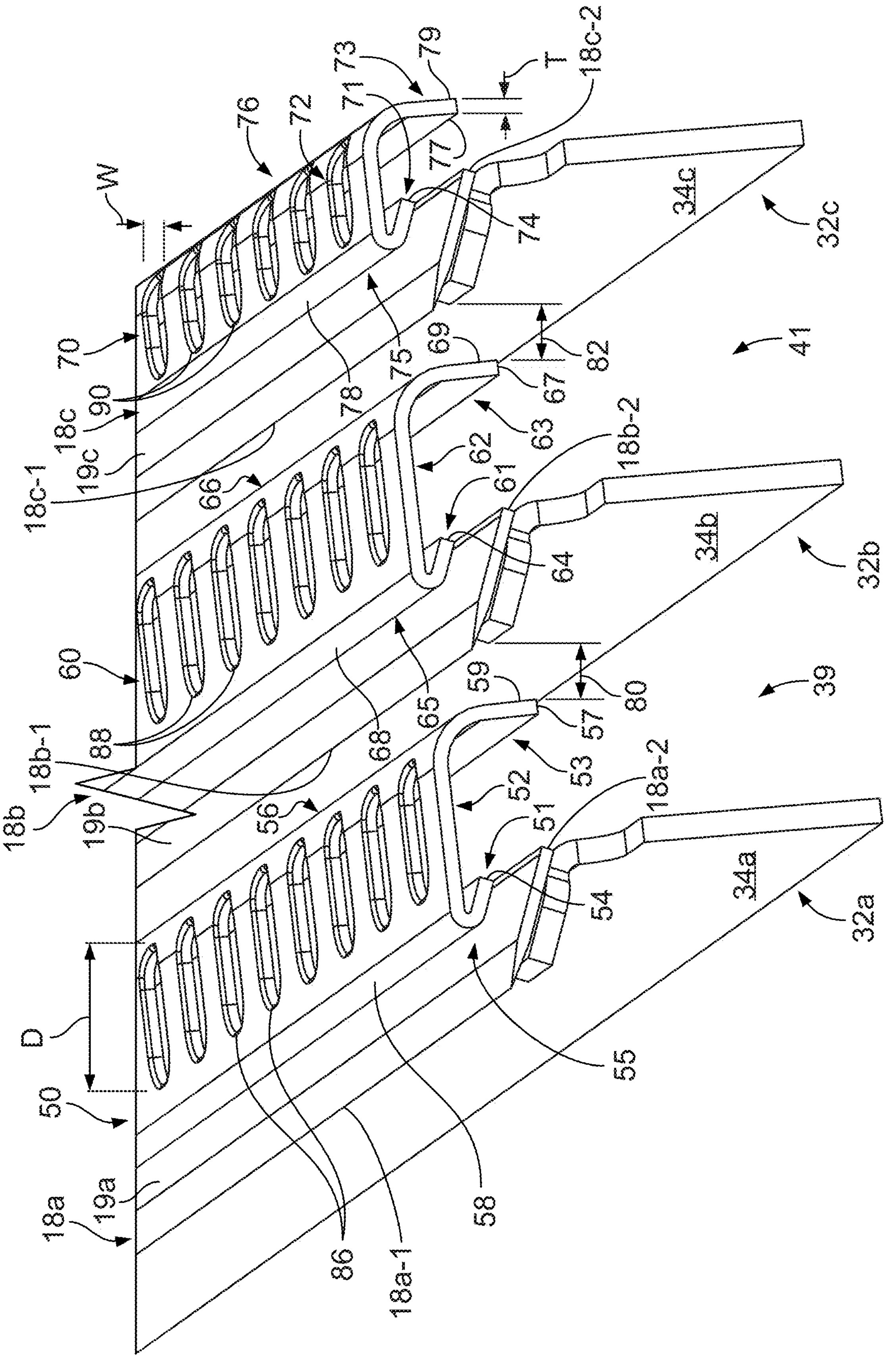
FIG. 4A is a front perspective view of a portion of the razor cartridge of FIG. 1, in which several components have been removed to illustrate the blade assemblies in detail.

As shown in FIGS. 2, 3, and 4A, the razor cartridge 14 may comprise first, second, and third blade assemblies 32*a* to 32*c*. The first blade assembly 32*a* may comprise a first blade 18*a* and a first blade support member 34*a* coupled to the first blade 18*a*. The second blade assembly 32*b* may comprise a second blade 18*b* and a second blade support member 34*b* coupled to the second blade 18*b*. The third blade assembly 32*c* may comprise a third blade 18*c* and a third blade support member 34*c* coupled to the third blade 18*c*. Each blade 18*a* to 18*c* comprises a respective blade tip 18*a*-1 to 18*c*-1 for cutting hairs and rear edge 18*a*-2 to 18*c*-2. The components of the blade assemblies 32*a* to 32*c* may comprise, for example, stainless steel. The blade support members 34*a* to 34*c* may be a unitary part of the blades 18*a* to 18*c*, or alternatively, the blades 18*a* to 18*c* may be fixedly coupled to the respective blade support members 34*a* to 34*c*, such as by welding, adhesive, or other suitable technique. Each blade assembly 32*a* to 32*c* may be mounted within the cartridge housing 16 of the razor cartridge 14. The blade support members 34*a* to 34*c* may be positioned within a respective blade slot 46*a* to 46*c* extending widthwise in the cartridge housing 16 and may be fixed or floating. The blade assemblies 32*a* to 32*c* may be secured by the clips 24*a* and 24*b* or other known assembly methods.

In the example shown in FIGS. 2, 3, and 4A, the first blade assembly 32*a* may be mounted in front of the second blade assembly 32*b*, and the second blade assembly 32*b* may be mounted in front of the third blade assembly 32*c*. As used herein, the terms "leading blade" and "leading blade assembly" refer to the blade and blade assembly that are located toward the front 25 of the cartridge housing 16 (see FIG. 2), and the terms "trailing blade" and "trailing blade assembly" refer to the blade and blade assembly that are located toward the back 26 of the cartridge housing 16 (see FIG. 2), with respect to a set of two or more blade assemblies mounted in the cartridge housing 16. For example, the first blade assembly 32*a* may comprise a leading blade and a leading blade assembly, with respect to the second blade assembly 32*b*, and the second blade assembly 32*b* may comprise a trailing blade and trailing blade assembly, with respect to the first blade assembly 32*a*. The second blade assembly 32*b* may comprise a leading blade and a leading blade assembly with respect to the third blade assembly 32*c*. The third blade assembly 32*c* comprises a trailing blade and a trailing blade assembly with respect to the first and second blade assemblies 32*a* and 32*b*. The blade assemblies 32*a* to 32*c* may be spaced apart from each other, as shown in FIG. 3. As shown in FIG. 3, a first interblade span $S_1$ may be defined between the blade tip 18*a*-1 of the first blade 18*a* and the blade tip 18*b*-1 of the second blade 18*b*, and a second interblade span $S_2$ may be defined between the blade tip 18*b*-1 of the second blade 18*b* and the blade tip 18*c*-1 of the third blade 18*c*, in which each interblade span $S_1$ and $S_2$ may be defined as a distance between a blade tip of one blade and a blade tip of an adjacent, consecutive blade. Each of the interblade spans $S_1$ and $S_2$ may be from about 2.0 mm to about 2.5 mm. A total blade span TBS, which comprises a sum of the first and second interblade spans $S_1$, $S_2$, may be from about 4.0 mm to about 5.0 mm. As described herein in more detail, the interblade span $S_1$, $S_2$ may generally decrease as a number of blade assemblies 32*a* to 32*c* in the razor cartridge 14 increases, and vice versa. The interblade span $S_1$ may be substantially similar to the interblade span $S_2$, as shown in the example in FIG. 3, or the interblade spans $S_1$ and $S_2$ may vary within the razor cartridge 14. Rinse channels 39 and 41 may be formed between adjacent ones of the blade assemblies 32*a* to 32*c* and may extend widthwise in the cartridge housing 16 of the razor cartridge 14, as shown in FIGS. 2, 3, and 4A. As described herein, the rinse channels 39 and 41 aid in the removal of cut hair, excess shave prep and/or soap, and other shaving debris from the razor cartridge 14 (see FIG. 2) to promote a more efficient and comfortable shave. One of the blade assemblies, e.g., the first blade assembly 32*a*, may also be adjacent to and spaced apart from the guard structure 28. One of the blade assemblies, e.g., the third blade assembly 32*c*, may also be adjacent to and spaced apart from the cap 22, and a gap 44 may be defined between the third blade assembly 32*c* and the cap 22.

With continued reference to FIGS. 2, 3, and 4A, a respective skin support element 50, 60, 70 may be affixed to one or more of the blade assemblies 32*a* to 32*c*. As used herein, the term "affixed" may mean that the skin support element 50, 60, and 70 is formed as part of, or is integral with, a component of the blade assembly 32*a* to 32*c* or is permanently coupled to a component of the blade assembly 32*a* to 32*c*, e.g., by welding, adhesive, or other suitable technique. In the example shown in FIGS. 2, 3, and 4A, a respective skin support element 50, 60 and 70 is affixed to each blade assembly 32*a* to 32*c*. In other examples, one or more of the blade assemblies may not have a skin support element affixed to it. For instance, the third blade assembly 32*c* adjacent to the cap 22 may lack a skin support element (see also FIGS. 5-8, 10, and 12). The skin support elements 50, 60, and 70 may comprise, for instance, stainless steel.

Figure 4B:
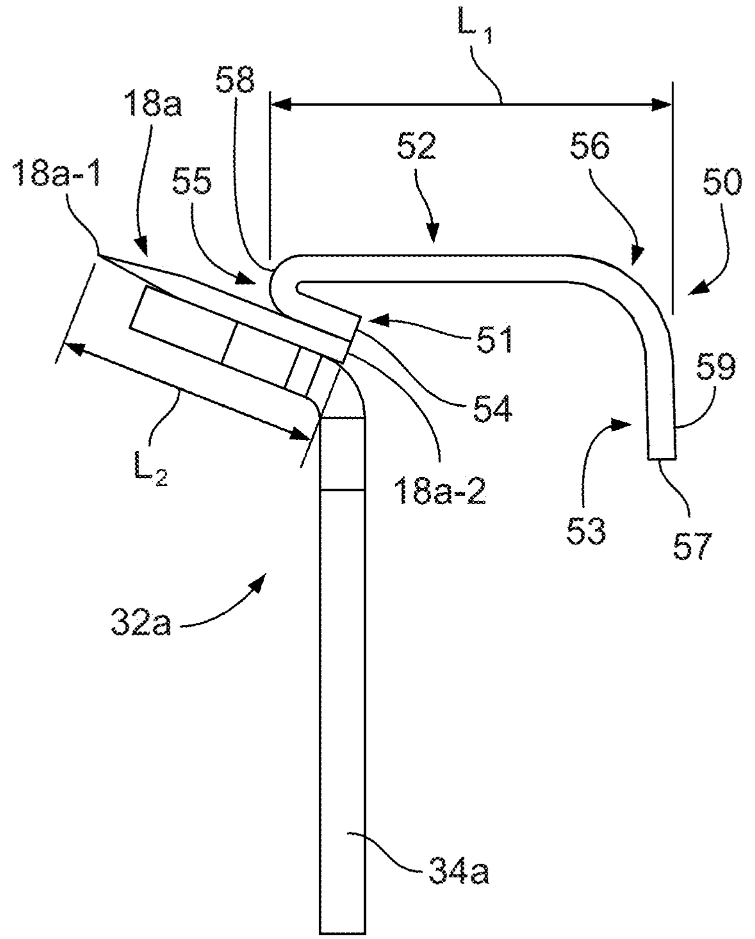
FIG. 4B is a detailed side view of one of the blade assemblies of FIG. 4A.

The skin support elements 50, 60 and 70 are affixed to a respective one of the blade assemblies 32*a* to 32*c* in FIGS. 2, 3, and 4A. The skin support elements 50, 60, and 70 extend widthwise along at least a portion of its respective blade 18*a* to 18*c*. Each skin support element 50, 60, and 70 may comprise one or more sections. With reference to the skin support element 50, it may comprise a leading section 51 affixed to the first blade 18*a*, an intermediate section 52, and a trailing section 53. The leading section 51 may comprise a leading edge 54 and may extend along a portion of an outer surface 19*a* of the first blade 18*a* between the rear edge 18*a*-2 and the blade tip 18*a*-1 of the first blade 18*a*. In particular, as shown in FIGS. 4A and 4B, the leading section 51 may extend from the leading edge 54 in a direction toward the blade tip 18*a*-1 of the first blade 18*a* and may be connected to the intermediate section 52 via a first curved connecting section 55, such that the intermediate section 52 extends in a direction away from the blade tip 18*a*-1 of the first blade 18*a*. In the example shown in FIGS. 2, 3, and 4A, the intermediate section 52 of the skin support element 50 may be generally planar, and at least a portion of the first curved connecting section 55 and the intermediate section 52 may together define a skin contacting surface that contacts the skin of the user during shaving. The trailing section 53, which may be connected to the intermediate section 52 via a second curved connecting section 56, may extend substantially vertically downward (i.e., at an angle of about 90° with respect to a blade plane defined between the blade tips 18*a*-1 to 18*c*-1, as described herein) toward the bottom 29 of the cartridge housing 16 (see FIG. 2) and may comprise a trailing edge 57. As described herein in more detail, the skin support element 50 may comprise a leading part 58 and a trailing part 59.

The skin support elements 60 and 70 may comprise a structure that is substantially similar to the skin support element 50. In particular, the skin support element 60 may comprise leading, intermediate, and trailing sections 61, 62, and 63, and the skin support element 70 may comprise leading, intermediate, and trailing sections 71, 72, and 73. The leading sections 61 and 71 may be affixed to the respective blade 18*b* and 18*c* and may comprise a respective leading edge 64 and 74. The leading sections 61 and 71 may extend along a portion of an outer surface 19*b* and 19*c* of the respective blade 18*b* and 18*c* between the rear edge 18*b*-2 and 18*c*-2 and the blade tip 18*b*-1 and 18*c*-1 of the respective blade 18*b* and 18*c*. In particular, the leading section 61 of the skin support element 60 may extend from the leading edge 64 in a direction toward the blade tip 18*b*-1 of the second blade 18*b* and may be connected to the intermediate section 62 via a first curved connecting section 65, such that the intermediate section 62 extends in a direction away from the blade tip 18*b*-1 of the second blade 18*b*. The leading section 71 of the skin support element 70 may similarly extend from the leading edge 74 in a direction toward the blade tip 18*c*-1 of the third blade 18*c* and may be connected to the intermediate section 72 via a first curved connecting section 75, such that the intermediate section 72 extends in a direction away from the blade tip 18*c*-1 of the third blade 18*c*. The intermediate sections 62 and 72 of the respective skin support elements 60 and 70 may be generally planar, and at least a portion of the respective first curved connecting sections 65 and 75 and intermediate sections 62 and 72 may together define respective skin contacting surfaces. The trailing sections 63 and 73, which may be connected to the respective intermediate sections 62 and 72 via a second curved connecting section 66 and 76, may extend substantially vertically downward toward the bottom 29 of the cartridge housing 16 (see FIG. 2) and may comprise a respective trailing edge 67 and 77. Each skin support element 60 and 70 may comprise a respective leading part 68 and 78 and trailing part 69 and 79.

As shown in FIGS. 2, 3, and 4A, the skin support element 50 affixed to the first blade assembly 32*a* extends past the blade support member 34*a* to which the blade 18*a* is coupled and toward the blade tip 18*b*-1 of the second blade assembly 32*b*. The skin support element 60 affixed to the second blade assembly 32*b* similarly extends past the blade support member 34*b* to which the blade 18*b* is coupled and toward the blade tip 18*c*-1 of the third blade assembly 32*c*. When present, the skin support element 70 affixed to the third blade assembly 32*c* may extend past the blade support member 34*c* to which the blade 18*c* is coupled and toward the cap 22.

The trailing parts 59, 69, and 79 of the respective skin support elements 50, 60, and 70 may be spaced apart from an adjacent structure, which may comprise another blade assembly or the cap. As used herein, the term "trailing part" may refer to a part of the trailing section that is located closest to the back 26 of the cartridge housing 16 (see FIG. 2). The trailing parts 59, 69, and 79 may be at least partially defined by the trailing sections 53, 63, and 73 of the respective skin support elements 50, 60, and 70. In the example shown in FIGS. 2, 3, and 4A, because the trailing sections 53, 63, and 73 of the skin support elements 50, 60, and 70 extend substantially vertically downward toward the bottom 29 of the cartridge housing 16, an outer surface of substantially an entirety of the trailing sections 53, 63, and 73 may define the respective trailing parts 59, 69, and 79 of the skin support elements 50, 60, and 70. The trailing part 59 of the skin support element 50 may be spaced apart from the blade tip 18*b*-1 of the second blade 18*b* by a first distance 80, and the trailing part 69 of the second skin support element 60 may be spaced apart from the blade tip 18*c*-1 of the third blade 18*c* by a second distance 82. The distances 80 and 82 may comprise a horizontal distance (i.e., a distance in a direction substantially parallel to the blade plane) between the trailing parts 59 and 69 and the blade tips 18*b*-1 and 18*c*-1 of the adjacent blades 18*b* and 18*c*. Each distance 80, 82 may comprise from about 0.25 mm to about 0.60 mm. The trailing part 79 of the third skin support element 70 may be spaced apart from the cap 22 by a third distance 84, which may also be from about 0.25 mm to about 0.60 mm. As seen in FIGS. 2, 3, and 4A, the trailing part 59, 69, and 79 of each respective skin support element 50, 60, and 70 is also spaced apart from, i.e., unattached to, the blade support member 34*a* to 34*c* to which the respective blade 18*a* to 18*c* is coupled.

With reference to FIGS. 3 and 4B, the skin support element 50 affixed to the first blade assembly 32*a* may comprise a horizontal length $L_1$ that is defined between the leading part 58 and the trailing part 59 of the skin support element 50. As used herein, the term "leading part" may refer to a part of the leading section 51 that is located closest to the front 25 of the cartridge housing 16 (see FIG. 2). In the example shown in FIGS. 3, 4A, and 4B, the leading part 58 may be at least partially defined by the first curved connecting section 55 of the skin support element 50. The horizontal length $L_1$ of the skin support element 50 may be from about 0.40 mm to about 2.0 mm. In some examples, the horizontal length $L_1$ of the skin support element 50 may be greater than the distance 80 from the trailing part 59 to the blade tip 18*b*-1 of the second blade assembly 32*b*. A distance 81 may be defined between the blade tip 18*a*-1 and the leading part 58 of the skin support element 50, which may be from about 0.25 mm to about 1.0 mm. The first blade 18*a* may comprise a length $L_2$ that is defined between the blade tip 18*a*-1 and the rear edge 18*a*-2 of the blade 18*a*. The length $L_2$ of the blade 18*a* may be from about 0.20 mm to about 1.25 mm. In some examples, the length $L_1$ of the skin support element 50 may be greater than the length $L_2$ of the blade 18*a*.

As shown in FIGS. 3 and 4A, the second blade assembly 32*b* and the skin support element 60 may be substantially similar to the first blade assembly 32*a* and the skin support element 50, with the leading part 68 of the skin support element 60 being at least partially defined by the first curved connecting section 65. The skin support element 60 may comprise a horizontal length (not labeled; defined between the leading and trailing parts 68 and 69) that is substantially similar to the length $L_1$ of the skin support element 50 and may be greater than the distance 82 from the trailing part 69 to the blade tip 18*c*-1 of the third blade assembly 32*c*. A distance (not labeled) may be defined between the blade tip 18*b*-1 of the second blade 18*b* and the leading part 68 of the skin support element 60, which may be substantially similar to the distance 81 defined between the blade tip 18*a*-1 and the leading part 58 of the skin support element 50. The second blade 18*b* may comprise a length (not labeled; defined between the blade tip 18*b*-1 and the rear edge 18*b*-2) that may be substantially similar to the $L_2$ of the first blade 18*a*. The length of the skin support element 60 may be greater than the length of the blade 18*b*.

Similar to the skin support elements 50 and 60, the leading part 78 of the skin support element 70 affixed to the third blade assembly 32*c* may be at least partially defined by the first curved connecting section 75, and the skin support element 70 may comprise a horizontal length (not labeled; defined between the leading and trailing parts 78 and 79). In the example illustrated in FIG. 3, due to the proximity of the third blade assembly 32*c* to the cap 22, the length of the skin support element 70 may be less than the length $L_1$ of the skin support elements 50 and 60 to avoid interference with the cap 22. In some examples, the length of the skin support element 70 may be from about 0.40 mm to about 0.9 mm. The length of the skin support element 70 may be greater than the distance 84 from the trailing part 79 to the cap 22. A distance (not labeled) may be defined between the blade tip 18*c*-1 of the third blade 18*c* and the leading part 78 of the skin support element 70, which may be substantially similar to the distance 81. The third blade 18*c* may comprise a length (not labeled; defined between the blade tip 18*c*-1 and the rear edge 18*c*-2) that may be substantially similar to the $L_2$ of the first blade 18*a*. In the illustrated example, the length of the skin support element 70 may be substantially similar to the length of the blade 18*c*. In other examples (not shown), the skin support element 70 may be substantially similar to the skin support elements 50 and 60, such that the length of the skin support element 70 may be greater than the length of the blade 18*c*.

One or more parameters of the blade assemblies 32*a* to 32*c* and/or the skin support elements 50 to 70 may be varied based on, for example, a number and/or spacing of the blade assemblies 32*a* to 32*c*. With reference to the example shown in FIGS. 3 and 4A with three blade assemblies 32*a* to 32*c*, the interblade spans $S_1$ and $S_2$ may each be from about 2.0 mm to about 2.5 mm, as described herein (see FIG. 5 and the discussion below for examples with two blade assemblies). For interblade spans $S_1$, $S_2$ near the higher end of this range for a three-bladed system, e.g., about 2.5 mm, the horizontal length of the skin support elements 50, 60 (see $L_1$ in FIG. 4B; defined between the respective ones of the leading 58, 68 and trailing parts 59, 69) may be about 2.0 mm; the distances 80, 82 may be about 0.25 mm; and the distances between the respective blade tips 18*a*-1, 18*a*-2 and leading parts 58, 68 of the skin support elements (see 81 in FIG. 3) may be about 0.25 mm. For interblade spans $S_1$, $S_2$ near the middle of this range, e.g., about 2.25 mm, the horizontal length of the skin support elements 50, 60 may be about 1.19 mm; the distances 80, 82 may be about 0.43 mm; and the distances between the respective blade tips 18*a*-1, 18*a*-2 and leading parts 58, 68 of the skin support elements may be about 0.63 mm. For interblade spans $S_1$, $S_2$ near the lower end of this range, e.g., about 2.0 mm, the horizontal length of the skin support elements 50, 60 may be about 0.40 mm; the distances 80, 82 may be about 0.60 mm; and the distances between the respective blade tips 18*a*-1, 18*a*-2 and leading parts 58, 68 of the skin support elements may be about 1.0 mm.

With reference to FIG. 3, a plane extending between the upper surfaces of the cap 22 and the guard structure 28 of the cartridge housing 16 of the razor cartridge 14 may define a shaving plane P for the blade tips 18*a*-1 to 18*c*-1 of the respective blades 18*a* to 18*c*. As shown with respect to the first blade 18*a*, a blade position plane may be defined by a line 92 extending outward from the tip 18*a*-1 parallel to the blade 18*a*. A first blade plane or first blade tip plane 94 may be defined by a line extending tangent to and between the blade tip 18*a*-1 of the first blade 18*a* and the blade tip 18*b*-1 of the second blade 18*b*, and a second blade plane or second blade tip plane 98 may be defined by a line extending tangent to and between the blade tip 18*b*-1 of the second blade 18*b* and the blade tip 18*c*-1 of the third blade 18*c*. In the example shown in FIG. 3, the blades 18*a* to 18*c* are positioned such that the first and second blade planes 94 and 98 are substantially coplanar with and parallel to the shaving plane P. In other examples, one or more of the blade planes may be located above or below the shaving plane P and/or may not be substantially parallel with the shaving plane P. As described in more detail herein, each of the skin support elements 50, 60, and 70 may be positioned such that its highest point(s) or surface, i.e., point(s) or surface located furthest from the bottom 29 of the cartridge housing 16, is at, above, or below the shaving plane P and/or one or more of the blade planes 94 and 98. In addition, at least a portion of each skin support element 50, 60, and 70 may extend substantially parallel to the shaving plane P and/or the blade planes 94 and 98. For example, as shown in FIG. 3, at least a portion of each intermediate section 52, 62, and 72 may extend substantially parallel to the shaving plane P and one or both of the blade planes 94 and 98.

As shown in FIG. 4A, one or more of the skin support elements 50, 60, and 70 may optionally comprise a respective plurality of openings 86, 88 and 90 that extend through a thickness T of the respective skin support element 50, 60, and 70. The thickness T of the skin support elements 50, 60, and 70 (shown with respect to representative skin support element 70) may comprise about 0.09 mm±0.03 mm. The openings 86, 88, and 90 may define any suitable shape and/or dimension. As shown in the example in FIG. 4A, the openings 86, 88, and 90 may comprise a substantially oval shape. In other examples (not shown), the openings 86, 88, and 90 may comprise a substantially circular shape, a substantially square or rectangular shape, and the like. The openings 86, 88, and 90 may comprise a width W, which may be at least about 0.20 mm to approximately half of a total width (not labeled) of the respective skin support element 50, 60, and 70 to allow rinsing of shaving debris as described herein. The openings 86, 88, and 90 may comprise a depth D, which may be from about 0.50 mm to about 3.0 mm. A spacing between adjacent ones of the respective openings 86, 88, and 90 may be adjusted as desired to space the openings 86, 88, and 90 closer together or further apart, with respect to each other. In the example shown, the openings 86, 88, and 90 may be formed between the respective leading parts 58, 68, and 78 and trailing parts 59, 69, and 79 of the skin support elements 50, 60, and 70 (i.e., formed substantially in the intermediate sections 52, 62, and 72), with a forward edge (not labeled) of the openings 86, 88, and 90 being substantially aligned in a vertical direction with the rear edges 18*a*-2 to 18*c*-2 of the respective blades 18*a* to 18*c* and a rear edge (not labeled) of the openings 86, 88, and 90 being formed near a junction between the intermediate sections 52, 62, and 72 and the respective second curved connecting sections 56, 66, and 76.

The openings 86, 88, and 90 may comprise rinse slots that are in fluid communication with respective ones of the rinse channels 39 and 41 defined between adjacent ones of the blade assemblies 32*a* to 32*c* and with the gap 44 defined between the third blade assembly 32*c* and the cap 22 to aid in the removal of shaving debris to promote a more efficient and comfortable shave. Because the skin support elements 50, 60, and 70 extend across at least a portion of the rinse channels 39 and 41 formed between adjacent ones of the blade assemblies 32*a* to 32*b* and across at least a portion of the gap 44, removal of shaving debris may be inhibited. In the absence of the openings 86, 88, and 90, the only points of entry for shaving debris into the rinse channels 39 and 41 and the gap 44 are the relatively small spaces defined between the trailing parts 59, 69, and 79 of the skin support elements and the adjacent structure (as illustrated by respective distances 80, 82, and 84 in FIG. 3). Providing the openings 86, 88, and 90 may help the shaving debris and liquid (e.g., water) to more easily enter the rinse channels 39 and 41 and the gap 44, where it may be flushed away and removed.

FIGS. 5-13 illustrate alternative embodiments of blade assemblies and associated skin support elements, in which the cartridge housing 16 of the razor cartridge 14 (see FIGS. 1 and 2) has been removed to illustrate the blade assemblies and skin support elements in detail. Some labeling of components has been removed in order to illustrate other aspects of the disclosed structure in detail.

Figure 5:
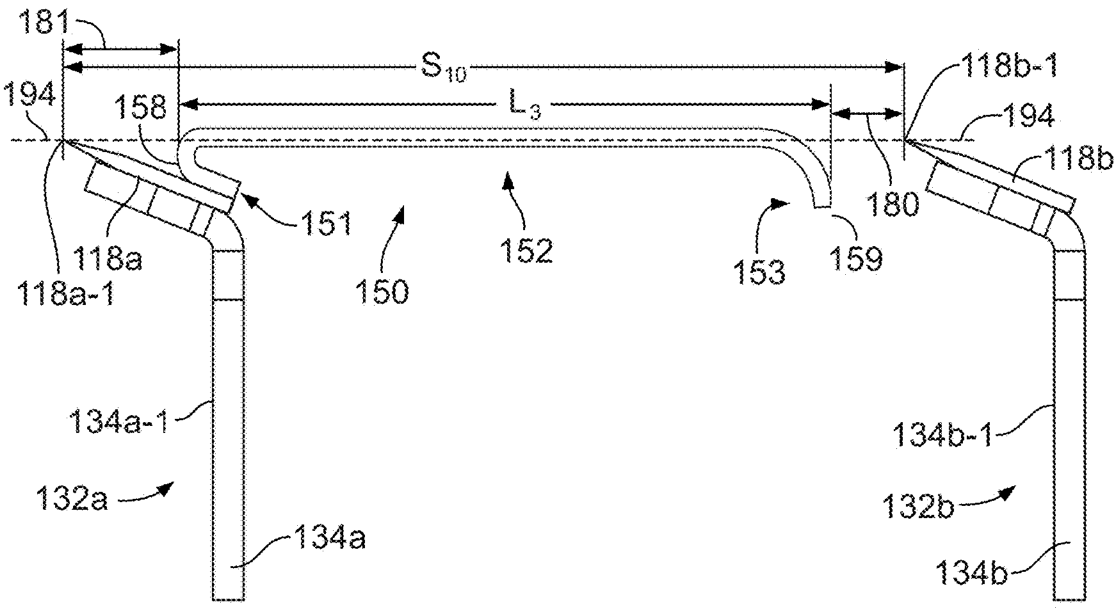
FIG. 5 is a side view of exemplary blade assemblies in accordance with a second aspect of the present disclosure.

FIG. 5 is a side view of first and second blade assemblies 132*a* and 132*b*, which may be substantially similar in structure to the first and second blade assemblies 32*a* and 32*b* in FIGS. 2, 3, 4A, and 4B. The first blade assembly 132*a* may comprise a first blade 118*a* and a first blade support member 134*a* coupled to the first blade 118*a*; and the second blade assembly 132*b* may comprise a second blade 118*b* and a second blade support member 134*b* coupled to the second blade 118*b*. The first blade assembly 132*a* may comprise a leading blade and a leading blade assembly with respect to the second blade assembly 132*b* and may be mounted to the cartridge housing 16 (see FIG. 2) in front of the second blade assembly 132*b*, which may comprise a trailing blade and a trailing blade assembly as described herein. The first blade assembly 132*a* may be spaced apart from the second blade assembly 132*b*, and an interblade span $S_{10}$ may be defined between a blade tip 118*a*-1 of the first blade 118*a* and a blade tip 118*b*-1 of the second blade 118*b*. The second blade assembly 132*b* may be adjacent to the cap 22 (see FIGS. 2 and 3), and a gap (not labeled) may be defined between the second blade assembly 132*b* and the cap 22.

A skin support element 150 may be affixed to the first blade assembly 132*a*, and in particular, the skin support element 150 may be affixed to, and extend widthwise along, at least a portion of the first blade 118A. The skin support element 150 may be substantially similar in structure to the skin support element 50 in FIGS. 2, 3, 4A, and 4B, except for a horizontal length $L_3$ of the skin support element 150, as discussed herein. The skin support element 150 may comprise a leading section 151 affixed to the blade 118*a* and comprising a leading part 158; an intermediate section 152 connected to the leading section 151 by a first curved connecting section (not labeled); and a trailing section 153 connected to the intermediate section 152 by a second curved connecting section (not labeled) and comprising a trailing part 159. The intermediate section 152 may be generally planar, and at least a portion of the first curved connecting section and the intermediate section 152 may together define a skin contacting surface. A distance 181 may be defined between the blade tip 118*a*-1 of the first blade 118*a* and the leading part 158 of the skin support element 150, which may be from about 0.25 to 1.0 mm.

In FIG. 5, a blade plane may be defined by a line 194 extending tangent to the blade tips 118*a*-1 and 118*b*-1 of the respective blades 118*a* and 118*b*. The blade plane 194 may be used to measure one or more vertical distances with respect to the blade plane 194. A highest point (not labeled) of the skin support element 150, which may be located along at least a portion of an outer surface (i.e., the surface facing away from the cartridge housing 16; see FIG. 2) of the generally planar intermediate section 152, may be positioned between about 0.13 mm above the blade plane 194 to about 0.07 mm below the blade plane 194. A preferred position may be at about 0.03 mm above the blade plane 194, such that the highest point on the skin support element 150 may sit slightly above the blade plane 194, as shown in FIG. 5. In some examples, the blade plane 194 may be substantially coplanar with and/or parallel to a shaving plane (not labeled in FIG. 5; see FIG. 3). At least a portion of the skin support element 150, i.e., the generally planar intermediate section 152, may extend substantially parallel to the blade plane 194 and/or the shaving plane. The skin support element 150 extends past the blade support member 134*a* to which the blade 118_a_ is coupled and toward the blade tip 118_b_-1 of the second blade assembly 132_b_. The trailing part 159 of the skin support element 150 is spaced apart from, i.e., unattached to, the blade support member 134_a_ to which the blade 118_a_ is coupled. Although not visible, the skin support element 150 may optionally comprise a plurality of openings, which may be substantially similar to the openings 86 in FIG. 4A. While only the first blade assembly 132_a_ in FIG. 5 is depicted as having a skin support element affixed to it, it is understood that the second blade assembly 132_b_ could also have a skin support element affixed to it, as described herein (see FIGS. 1-3 and 4A).

As shown in FIG. 5, the trailing part 159 of the skin support element 150 may be spaced apart from the blade tip 118_b_-1 of the second blade 118_b_ by a distance 180, which may be from about 0.25 mm to about 0.60 mm. The interblade span $S_{10}$ may be from about 4.0 mm to about 5.0 mm, and the horizontal length $L_3$ of the skin support element 150 (defined between the leading and trailing parts 158 and 159) may be from about 2.4 mm to about 4.5 mm. The horizontal length $L_3$ of the skin support element 150 may be greater than the distance 180 and greater than a length (not labeled in FIG. 5; see FIG. 4B) of the blade 118_a_.

In general, because the example illustrated in FIG. 5 includes only two blade assemblies 132_a_, 132_b_, a spacing between the first and second blade assemblies 132_a_ and 132_b_ may be greater than the spacing between the first and second blade assemblies 32_a_ and 32_b_ in FIG. 3, such that the interblade span $S_{10}$ (which also defines a total blade span) in FIG. 5 is greater than the interblade span $S_1$ in the three-bladed system depicted in FIG. 3. The horizontal length $L_3$ of the skin support element 150 in FIG. 5 may also be greater than the horizontal length $L_1$ of the skin support element 50 in FIG. 4B.

One or more parameters of the blade assemblies 132_a_ and 132_b_ and/or the skin support element 150 in FIG. 5 may be varied based on, for example, a number and/or spacing of the blade assemblies 132_a_ and 132_b_. In the depicted example with two blade assemblies 132_a_ and 132_b_, the interblade span $S_{10}$ (which also defines a total blade span) may be from about 4.0 mm to about 5.0 mm, as described herein (see FIGS. 3 and 4A and the preceding discussion for examples with three blade assemblies). For an interblade span $S_{10}$ near the higher end of the described range for a two-bladed system, e.g., about 5.0 mm, the horizontal length $L_3$ of the skin support element 150 may be about 4.5 mm; the distance 180 may be about 0.25 mm; and the distance 181 may be about 0.25 mm. For an interblade span $S_{10}$ near the middle of this range, e.g., about 4.5 mm, the horizontal length $L_3$ of the skin support element 150 may be about 3.44 mm; the distance 180 may be about 0.43 mm; and the distance 181 may be about 0.63 mm. For an interblade span $S_{10}$ near the lower end of this range, e.g., about 4.0 mm, the horizontal length $L_3$ of the skin support element 150 may be about 2.4 mm; the distance 180 may be about 0.60 mm; and the distance 181 may be about 1.0 mm.

Figure 6:
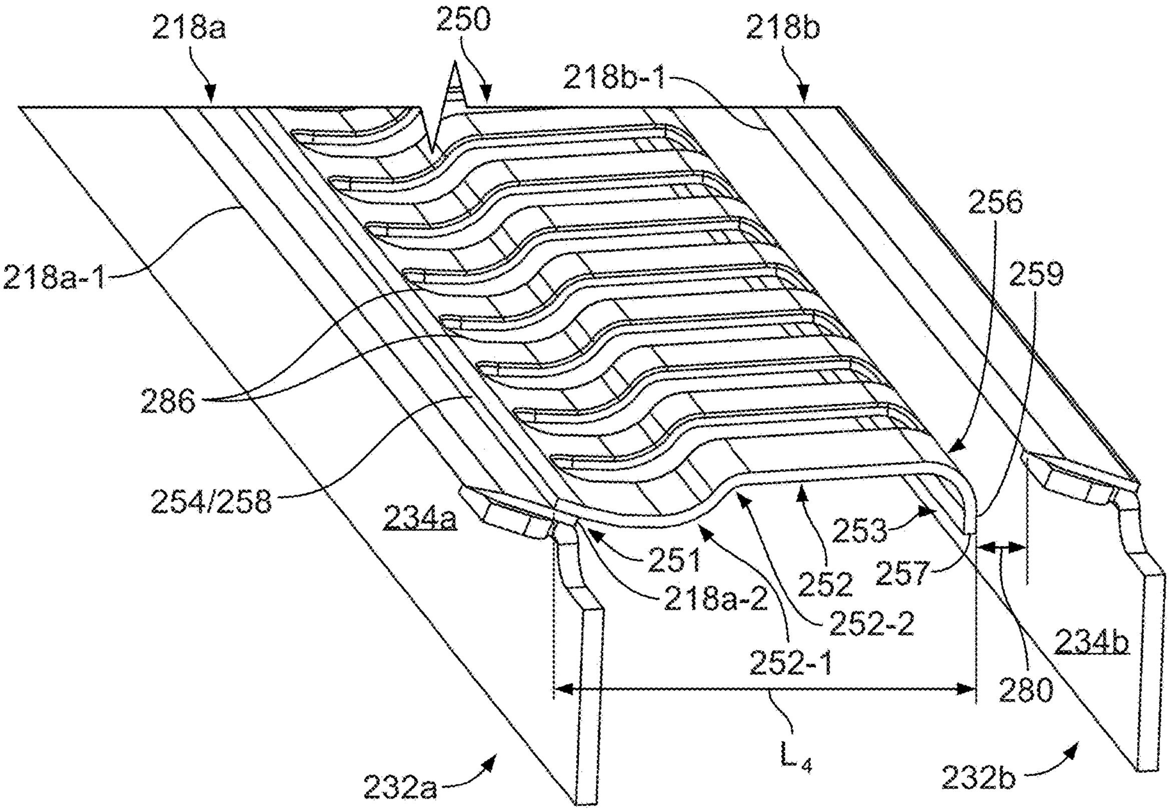
FIG. 6 is a front perspective view of exemplary blade assemblies in accordance with a third aspect of the present disclosure.
Figure 7:
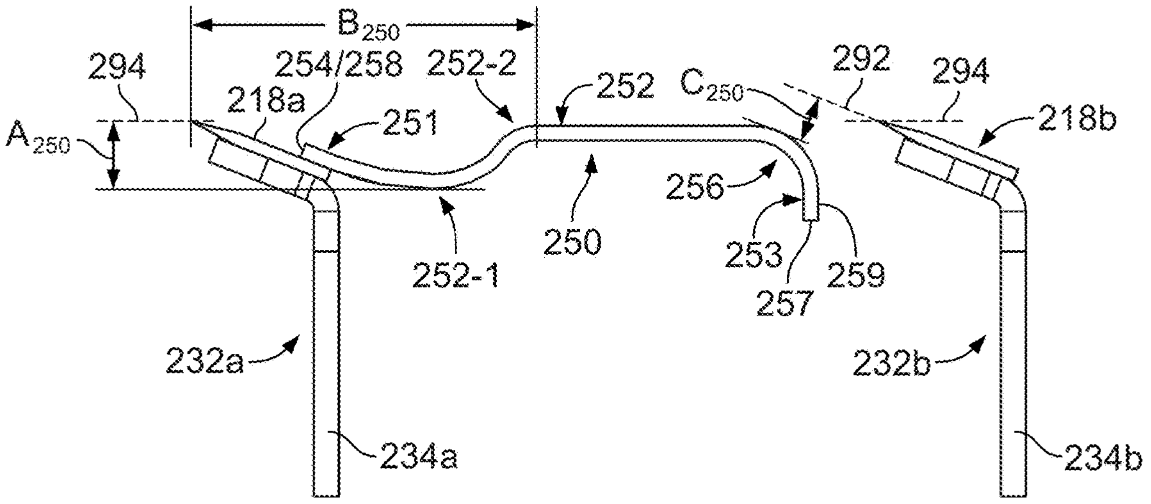
FIG. 7 is a side view of the blade assemblies of FIG. 6.

FIGS. 6 and 7 are perspective and side views, respectively, of first and second blade assemblies 232_a_ and 232_b_, which may be substantially similar in structure to the first and second blade assemblies 32_a_ and 32_b_ in FIGS. 2, 3, 4A, and 4B. The first blade assembly 232_a_ may comprise a first blade 218_a_ and a first blade support member 234_a_ coupled to the first blade 218_a_; and the second blade assembly 232_b_ may comprise a second blade 218_b_ and a second blade support member 234_b_ coupled to the second blade 218_b_. The blade assemblies 232_a_ and 232_b_ may be mounted to the cartridge housing 16 (see FIG. 2) and may comprise leading and trailing blades and blade assemblies, as described herein. Although only two blade assemblies are shown, it is understood that the razor cartridge may comprise three or more blade assemblies (see FIGS. 1-3 and 4A). The first blade assembly 232_a_ may be spaced apart from the second blade assembly 232_b_, and an interblade span (not labeled) may be defined between a blade tip 218_a_-1 of the first blade 218_a_ and a blade tip 218_b_-1 of the second blade 218_b_, which may be from about 2.0 mm to about 5.0 mm as described herein. The second blade assembly 232_b_ may be adjacent to the cap 22 (see FIGS. 2 and 3), and a gap (not labeled) may be defined between the second blade assembly 232_b_ and the cap 22.

A skin support element 250 may be affixed to the first blade assembly 232_a_, and in particular, the skin support element 250 may be affixed to, and extend widthwise along, at least a portion of the first blade 218A. The skin support element 250 may comprise a leading section 251 affixed to the blade 218_a_ and comprising a leading part 258; an intermediate section 252; and a trailing section 253 comprising a trailing part 259. The skin support element 250 extends past the blade support member 234_a_ to which the blade 218_a_ is coupled and toward the blade tip 218_b_-1 of the second blade assembly 232_b_. The trailing part 259 of the skin support element 250 is spaced apart from, i.e., unattached to, the blade support member 234_a_ to which the blade 218_a_ is coupled. The skin support element 250 may optionally comprise a plurality of openings 286, which may be substantially similar to the openings 86 shown in FIG. 4A and described herein. While only the first blade assembly 232_a_ in FIGS. 6 and 7 is depicted as having a skin support element affixed to it, it is understood that the second blade assembly 232_b_ could also comprise a skin support element affixed to it, as described herein (see FIGS. 1-3 and 4A).

With continued reference to FIGS. 6 and 7, the leading section 251 of the skin support element 250 may comprise a leading edge 254 and may extend along a portion of an outer surface (not labeled) of the first blade 218_a_ between the blade tip 218_a_-1 and a rear edge 218_a_-2 of the first blade 218_a_. In particular, the leading section 251 may extend from the leading edge 254 in a direction from the blade tip 218_a_-1 toward the rear edge 218_a_-2 of the blade 218_a_. The intermediate section 252 is connected to the leading section 251 and extends in a direction away from the blade tip 218_a_-1 of the first blade 218_a_. In the example shown in FIGS. 6 and 7, the intermediate section 252 may comprise one or more curved portions. A first curved portion 252-1 may be connected to the leading section 251 and may curve downward toward the bottom 29 of the cartridge housing 16 (see FIG. 2). A second curved portion 252-2 may be connected to the first curved portion 252-1 and may curve upward in a direction away from the bottom 29 of the cartridge housing 16 (see FIG. 2). The second curved portion 252-2 may comprise a radius of curvature of about 0.35 mm. In the example shown in FIGS. 6 and 7, the first curved portion 252-1 may be lower than, i.e., closer to the bottom 29 of the cartridge housing 16, the second curved portion 252-2. The intermediate section 252 may comprise a portion extending between the second curved portion 252-2 and the trailing section 253 that is generally planar and defines a skin contacting surface. The trailing section 253 may be connected to the generally planar portion of the intermediate section 252 via a curved connecting section 256.

In FIG. 7, a blade plane may be defined by a line 294 extending tangent to the blade tips 218_a_-1 and 218_b_-1 of the respective blades 218_a_ and 218_b_, which may be used to measure vertical distances with respect to the blade plane

294. A vertical distance from the blade plane 294 to a lowest point of the first curved portion 252-1 may be about 0.30 mm±0.10 mm, as measured with respect to an inner surface (i.e., the surface nearest the cartridge housing 16; see FIG. 2) of the first curved portion 252-1 and indicated by measurement $A_{250}$. A highest point (not labeled) of the skin support element 250, which may be located along at least a portion of an outer surface of the generally planar portion of the intermediate section 252, may be positioned between about 0.13 mm above the blade plane 294 to about 0.07 mm below the blade plane 294, with a preferred position being at about 0.03 mm above the blade plane 294. A horizontal distance from the blade tip 218*a*-1 of the blade 218*a* to the start of the generally planar portion of the intermediate section 252 may comprise about 2.10 mm, as indicated by measurement $B_{250}$. In some examples, the blade plane 294 may be substantially coplanar with and/or parallel to a shaving plane (not labeled in FIG. 7; see FIG. 3). At least a portion of the skin support element 250, i.e., the generally planar portion of the intermediate section 252, may extend substantially parallel to the blade plane 294 and/or the shaving plane. A blade position plane may be defined by a line 292 extending outward from the blade tip 218*a*-2 parallel to the blade 218*b*. A distance from the blade position plane 292 to a parallel tangent point on an outer surface of the second curved connecting section 256 may comprise about 0.35 mm, as indicated by measurement $C_{250}$.

In the example shown in FIGS. 6 and 7, the leading part 258 of the skin support element 250 may be defined by the leading edge 254, and the trailing part 259 may be at least partially defined by the trailing section 253. A distance (not labeled) may be defined between the blade tip 218*a*-1 of the first blade 218*a* and the leading part 258 of the skin support element 250, which may be substantially similar to the distance 81 in FIG. 3 or the distance 181 in FIG. 5. The trailing section 253 may be substantially similar in structure to the trailing section 53 of the skin support element 50 shown in FIGS. 4A and 4B. The trailing section 253 may comprise a trailing edge 257 that is vertically spaced from the leading edge 254 of the leading section 251. The trailing part 259 may be spaced apart from the blade tip 218*b*-1 of the second blade 218*b* by a distance 280. In some instances, the distance 280 may be substantially similar to the distance 80 in FIG. 3. A horizontal length $L_4$ of the skin support element 250 (defined between the leading and trailing parts 258 and 259) may be from about 0.40 mm to about 4.5 mm. The horizontal length $L_4$ of the skin support element 250 may be greater than the distance 280 and greater than a length (not labeled in FIG. 7; see FIG. 4B) of the blade 218*a*. One or more parameters of the blade assemblies 232*a* and 232*b* and/or the skin support element 250 may be varied based on, for example, a number and/or spacing of the blade assemblies 232*a* and 232*b*, as described herein in detail.

Figure 8:
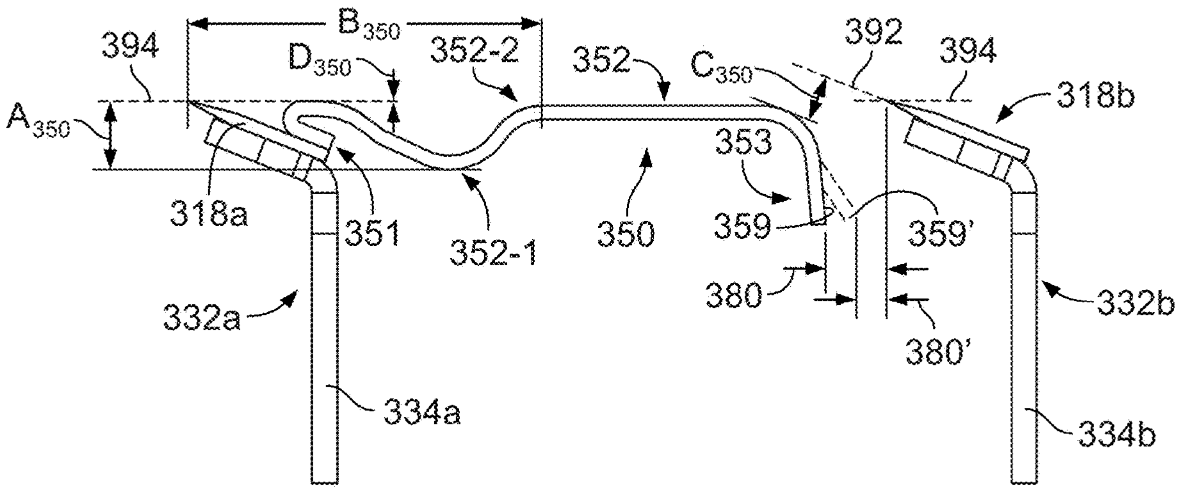
FIG. 8 is a side view of exemplary blade assemblies in accordance with a fourth aspect of the present disclosure.

FIG. 8 is a side view of first and second blade assemblies 332*a* and 332*b*, which may be substantially similar in structure to the first and second blade assemblies 32*a* and 32*b* in FIGS. 2, 3, 4A, and 4B. The first blade assembly 332*a* may comprise a first blade 318*a* and a first blade support member 334*a* coupled to the first blade 318*a*; and the second blade assembly 332*b* may comprise a second blade 318*b* and a second blade support member 334*b* coupled to the second blade 318*b*. The blade assemblies 332*a* and 332*b* may be mounted to the cartridge housing 16 (see FIG. 2) and may comprise leading and trailing blades and blade assemblies, as described herein. Although only two blade assemblies are shown, it is understood that the razor cartridge may comprise three or more blade assemblies (see FIGS. 1-3 and 4A). The first blade assembly 332*a* may be spaced apart from the second blade assembly 332*b*, and an interblade span (not labeled) may be defined between a blade tip (not labeled) of the first blade 318*a* and a blade tip (not labeled) of the second blade 318*b*, which may be from about 2.0 mm to about 5.0 mm. The second blade assembly 332*b* may be adjacent to the cap 22 (see FIGS. 2 and 3), and a gap (not labeled) may be defined between the second blade assembly 332*b* and the cap 22.

A skin support element 350 may be affixed to the first blade assembly 332*a*, and in particular, the skin support element 350 may be affixed to, and extend widthwise along, at least a portion of the first blade 318*a*. The skin support element 350 may comprise a leading section 351 affixed to the blade 318*a* and comprising a leading part (not labeled); an intermediate section 352; and a trailing section 353 connected to the intermediate section 352 by a second curved connecting section (not labeled) and comprising a trailing part 359/359'. The skin support element 350 extends past the blade support member 334*a* to which the blade 318*a* is coupled and toward the blade tip of the second blade assembly 332*b*. The trailing part 359/359' of the skin support element 350 is spaced apart from, i.e., unattached to, the blade support member 334*a* to which the blade 318*a* is coupled. Although not visible, the skin support element 350 may optionally comprise a plurality of openings, which may be substantially similar to the openings 86 in FIG. 4A. While only the first blade assembly 332*a* in FIG. 8 is depicted as having a skin support element affixed to it, it is understood that the second blade assembly 332*b* could also comprise a skin support element affixed to it (see FIGS. 1-3 and 4A).

Similar to the leading section 51 of the skin support element 50 in FIGS. 2, 3, 4A, and 4B, the leading section 351 of the skin support element 350 may extend from a leading edge (not labeled) in a direction toward the blade tip of the first blade 318*a* and may be connected to the intermediate section 352 via a first curved connecting section (not labeled), such that the intermediate section 352 extends in a direction away from the blade tip of the first blade 318*a*. A distance (not labeled) may be defined between the blade tip of the first blade 318*a* and the leading part of the skin support element 350, which may be substantially similar to the distance 81 in FIG. 3 or the distance 181 in FIG. 5. In the example shown in FIG. 8, the intermediate section 352 may comprise one or more curved portions. A first curved portion 352-1 may be connected to the leading section 351 and may curve downward toward the bottom 29 of the cartridge housing 16 (see FIG. 2). A second curved portion 352-2 may be connected to the first curved portion 352-1 and may curve upward in a direction away from the bottom 29 of the cartridge housing 16 (see FIG. 2). The second curved portion 352-2 may comprise a radius of curvature of about 0.35 mm. The intermediate section 352 may comprise a portion extending between the second curved portion 352-2 and the trailing section 353 that is generally planar. At least a portion of the first curved connecting section and the generally planar portion of the intermediate section 352 may define a skin contacting surface. The trailing section 353 may be connected to the generally planar portion of the intermediate section 352 via the second curved connecting section (not labeled).

In FIG. 8, a blade plane may be defined by a line 394 tangent to the blade tips of the respective blades 318*a* and 318*b*, which may be used to measure vertical distances with respect to the blade plane 394. A vertical distance from the blade plane 394 to a highest point on the first curved connecting section may be from about 0 mm to about 0.03 mm below the blade plane 394, as measured between the blade plane 394 and an outer surface of the first curved connecting section and indicated by measurement $D_{350}$. A vertical distance from the blade plane 394 to a lowest point of the first curved portion 352-1 may be about 0.30 mm±0.10 mm, as measured with respect to an inner surface of the first curved portion 352-1 and indicated by measurement $A_{350}$. A highest point (not labeled) of the skin support element 350, which may be located along at least a portion of an outer surface of the generally planar portion of the intermediate section 352, may be positioned between about 0.13 mm above the blade plane 394 to about 0.07 mm below the blade plane 394, with a preferred position being at about 0.03 mm above the blade plane 394. In the example shown in FIG. 8, a highest point on the first curved connecting section may be at or slightly below, but generally does not extend above, the blade plane and the highest point along the intermediate section 352. A horizontal distance from the blade tip of the blade 318*a* to a start of the generally planar portion of the intermediate section 352 may comprise about 2.10 mm, as indicated by measurement $B_{350}$. In some examples, the blade plane 394 may be substantially coplanar with and/or parallel to a shaving plane (not labeled in FIG. 8; see FIG. 3). At least a portion of the skin support element 350, i.e., the generally planar portion of the intermediate section 352, may extend substantially parallel to the blade plane 394 and/or the shaving plane. A blade position plane may be defined by a line 392 extending outward from the blade tip parallel to the blade 318*b*. A distance from the blade position plane 392 to a parallel tangent point on an outer surface of the second curved connecting section may comprise about 0.35 mm, as indicated by measurement $C_{350}$. The trailing section 353 may comprise a trailing edge (not labeled) that is vertically spaced from the leading edge (not labeled) of the leading section 351.

In some examples, similar to the trailing section 53 of the skin support element 50 in FIGS. 4A and 4B, the trailing section 353 of the skin support element 350 in FIG. 8 may extend substantially vertically downward (i.e., at an angle of about 90° with respect to the blade plane 394) toward the bottom 29 of the cartridge housing 16 (see FIG. 2), such that substantially an entirety of an outer surface of the trailing section 353 defines the trailing part 359. The trailing part 359 may be spaced apart from the blade tip of the second blade 318*b* by a distance 380, which may be substantially similar to the distance 80 in FIG. 3. In other examples, the trailing section 353 may be sloped, such that the trailing section 353 extends downward toward the bottom 29 of the cartridge housing 16 at an acute angle (i.e., less than 90°) relative to the blade plane 394, in which the angle of the trailing section 353 relative to the blade plane 394 may be from about 45° to less than 90°. The trailing part 359', which may comprise the part or point of the trailing section 353 that extends the furthest toward the back 26 of the cartridge housing 16 (see FIG. 2), may be spaced apart from the blade tip of the second blade 318*b* by a distance 380'. A horizontal length (not labeled; defined between the leading part and trailing part 359/359') of the skin support element 350 may be from about 0.40 mm to about 4.5 mm. The horizontal length of the skin support element 350 may be greater than the distance 380/380' and greater than a length (not labeled in FIG. 8; see FIG. 4B) of the blade 318*a*. One or more parameters of the blade assemblies 332*a* and 332*b* and/or the skin support element 350 may be varied based on, for example, a number and/or spacing of the blade assemblies 332*a* and 332*b*, as described herein in detail.

Figure 9:
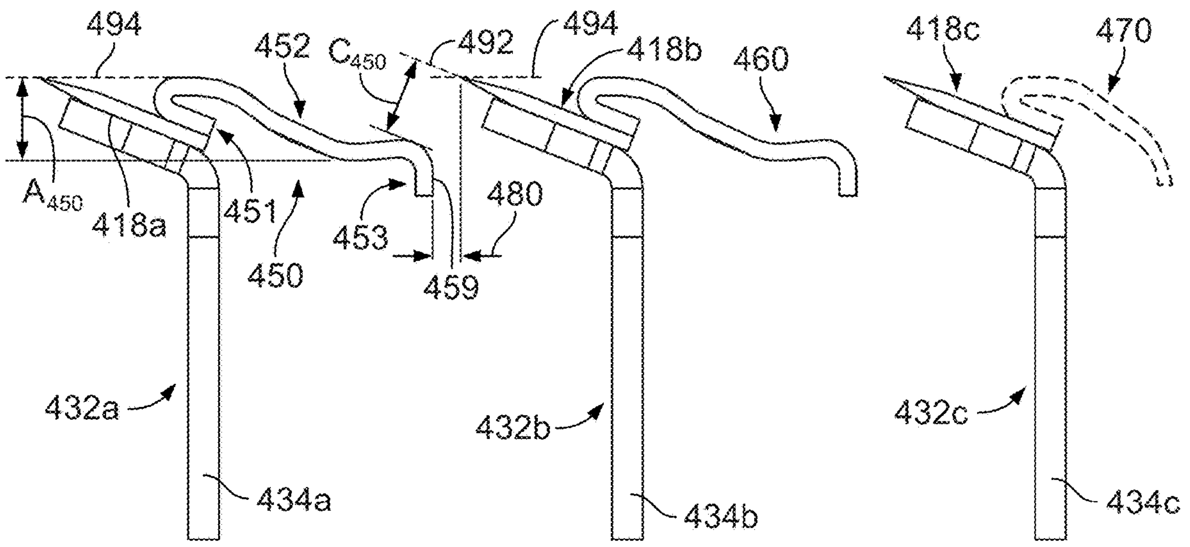
FIG. 9 is a side view of exemplary blade assemblies in accordance with a fifth aspect of the present disclosure.

FIG. 9 is a side view of first, second, and third blade assemblies 432*a*, 432*b*, and 432*c*, which may be substantially similar in structure to the first and second blade assemblies 32*a* and 32*b* in FIGS. 2, 3, 4A, and 4B. Each blade assembly 432*a*, 432*b*, and 432*c* may comprise a respective blade 418*a*, 418*b*, and 418*c* and blade support member 434*a*, 434*b*, and 434*c* coupled to the respective blade 418*a*, 418*b*, and 418*c*, with each blade assembly 432*a* to 432*c* being mounted to the cartridge housing 16 of the razor cartridge 14 (see FIG. 2). The blade assemblies 432*a* to 432*c* may comprise leading and trailing blades and blade assemblies, as described herein. The blade assemblies 432*a* to 432*c* may be spaced apart from each other. A first interblade span (not labeled) may be defined between a blade tip (not labeled) of the first blade 418*a* and a blade tip (not labeled) of the second blade 418*b*, and a second interblade span (not labeled) may be defined between the blade tip of the second blade 418*b* and a blade tip (not labeled) of the third blade 418*c*, both of which may be from about 2.0 mm to about 5.0 mm. The third blade assembly 332*c* may be adjacent to the cap 22 (see FIGS. 2 and 3), and a gap (not labeled) may be defined between the third blade assembly 332*c* and the cap 22.

A skin support element 450, 460, and 470 may be affixed to a respective one of the blade assemblies 432*a* to 432*c*, and in particular, the skin support elements 450, 460, and 470 may be affixed to, and extend widthwise along, at least a portion of the respective blades 418*a* to 418*c*. The skin support elements 450, 460, and 470 extend past the blade support members 434*a* to 434*c* to which the respective blade 418*a* to 418*c* is coupled and toward the blade tip of the adjacent blade assembly 432*b* and 432*c* or the cap 22. Although not visible, the skin support elements 450, 460, and 470 may optionally comprise a plurality of openings, which may be substantially similar to the openings 86 in FIG. 4A.

With reference to the first blade assembly 432*a* in FIG. 9, the skin support element 450 may comprise a leading section 451 affixed to the blade 418*a* and comprising a leading part (not labeled); an intermediate section 452; and a trailing section 453 comprising a trailing part 459. Similar to the leading section 51 of the skin support element 50 in FIGS. 2, 3, 4A, and 4B, the leading section 451 of the skin support element 450 may extend from a leading edge (not labeled) in a direction toward the blade tip of the first blade 418*a* and may be connected to the intermediate section 452 via a first curved connecting section (not labeled), such that the intermediate section 452 extends in a direction away from the blade tip of the first blade 418*a*. A distance (not labeled) may be defined between the blade tip of the first blade 418*a* and the leading part of the skin support element 450, which may be substantially similar to the distance 81 in FIG. 3. In the example shown in FIG. 9, the intermediate section 452 may comprise one or more curved or sloped portions. A first portion (not labeled) of the intermediate section 452 may be connected to the leading section 451 and may curve or slope downward toward the bottom 29 of the cartridge housing 16 (see FIG. 2). A second portion (not labeled) of the intermediate section 452 may be connected to the first portion and may be generally planar or may curve or slope upward in a direction away from the bottom 29 of the cartridge housing 16. The trailing section 453, which may be connected to the second portion of the intermediate section 452 via a second curved connecting section (not labeled), may extend substantially vertically downward toward the bottom 29 of the cartridge housing 16 (see FIG. 2). The trailing part 459 is spaced apart from, i.e., unattached to, the blade support member 434*a* to which the blade 418*a* is coupled.

In FIG. 9, a blade plane may be defined by a line 494 extending tangent to the blade tips of respective ones of the first and second blades 418*a* and 418*b*, which may be used to measure vertical distances with respect to the blade plane 494. A blade plane (not shown) may similarly be defined for the second and third blades 418*b* and 418*c*. With respect to the skin support element 450, a highest point of the skin support element 450, which may be located along at least a portion of an outer surface of the intermediate section 452 may be positioned between about 0.13 mm above the blade plane 494 to about 0.07 mm below the blade plane 494, with a preferred position being at about 0.03 mm above the blade plane 494. In the example shown in FIG. 9, the highest point on the first curved connecting section and/or the intermediate section 452 may define a skin contacting surface. A vertical distance from the blade plane 494 to a lowest point of the intermediate section 452 may be about 0.30 mm±0.10 mm below the blade plane 494, as measured with respect to an inner surface of the intermediate section 452 and indicated by measurement $A_{450}$. In some examples, the blade plane 494 may be substantially coplanar with and/or parallel to a shaving plane (not labeled in FIG. 9; see FIG. 3). A blade position plane may be defined by a line 492 extending outward from the blade tip parallel to the blade 418*b*. A distance from the blade position plane 492 to a parallel tangent point on an outer surface of the second curved connecting section may comprise about 0.35 mm, as indicated by measurement $C_{450}$.

The leading part (not labeled) of the skin support element 450 may be at least partially defined by the first curved connecting section, and the trailing part 459 may be at least partially defined by the trailing section 453. The trailing part 459 may be spaced apart from the blade tip of the second blade 418*b* by a distance 480. In some instances, the distance 480 may be substantially similar to the distance 80 in FIG. 3. A horizontal length (not labeled; defined between the leading part and trailing part 459) of the skin support element 450 may be from about 0.40 mm to about 4.5 mm. The horizontal length of the skin support element 450 may be greater than the distance 480 and greater than a length (not labeled in FIG. 9; see FIG. 4B) of the blade 418*a*.

The skin support element 460 in FIG. 9 may be substantially similar in structure to the skin support element 450. The leading section (not labeled) of the skin support element 470 may be substantially similar in structure to the skin support elements 450 and 460, but similar to the skin support element 70 in FIGS. 2, 3, and 4A, a horizontal length (not labeled) of the skin support element 470 may be reduced, as compared to the skin support elements 450 and 460, to avoid interference with the cap 22 (see FIG. 3). In the illustrated example, the intermediate and trailing sections (not labeled) of the skin support element 470 are shortened. In other examples (not shown), the length of the skin support element 470 may be substantially similar to the length of the skin support elements 450 and 460. A distance (not labeled) may be defined between the respective blade tips of the second and third blades 418*b*, 418*c* and the leading parts of the skin support elements 460, 470, which may be substantially similar to the distance 81 in FIG. 3. One or more parameters of the blade assemblies 432*a* to 432*c* and/or the skin support elements 450 to 470 may be varied based on, for example, a number and/or spacing of the blade assemblies 432*a* to 432*c*, as described herein in detail.

Figure 10:
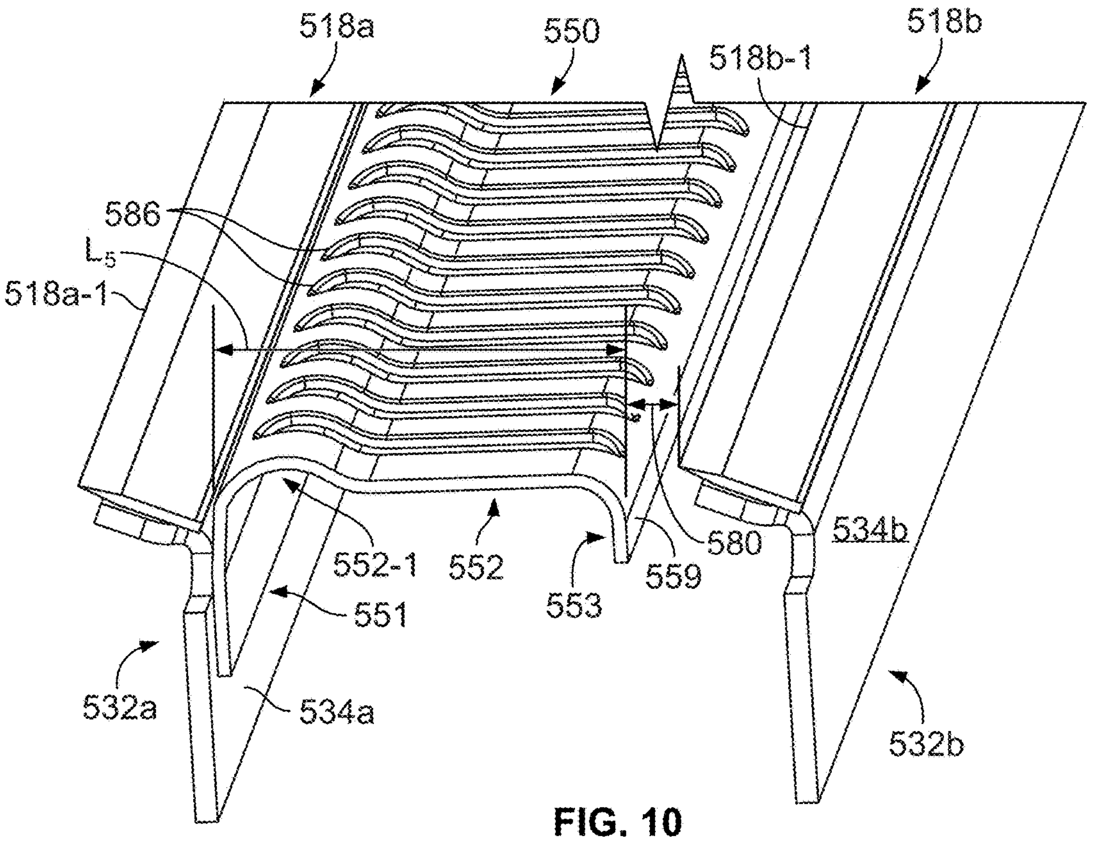
FIG. 10 is a back perspective view of exemplary blade assemblies in accordance with a sixth aspect of the present disclosure.

FIG. 10 is a perspective view of first and second blade assemblies 532*a* and 532*b*, which may be substantially similar in structure to the first and second blade assemblies 32*a* and 32*b* in FIGS. 2, 3, 4A, and 4B. Each blade assembly 532*a* and 532*b* may comprise a respective blade 518*a* and 518*b* and blade support member 534*a* and 534*b* coupled to the respective blade 518*a* and 518*b*, with each blade assembly 532*a* and 532*b* being mounted to the cartridge housing 16 of the razor cartridge 14 (see FIG. 2). The blade assemblies 532*a* and 532*b* may comprise leading and trailing blades and blade assemblies, as described herein. Although only two blade assemblies are shown, it is understood that the razor cartridge may comprise three or more blade assemblies (see FIGS. 1-3 and 4A). The first blade assembly 532*a* may be spaced apart from the second blade assembly 532*b*, and an interblade span (not labeled) may be defined between a blade tip 518*a*-1 of the first blade 518*a* and a blade tip 518*b*-1 of the second blade 518*b*, which may be from about 2.0 mm to about 5.0 mm. The second blade assembly 532*b* may be adjacent to the cap 22 (see FIGS. 2 and 3), and a gap (not labeled) may be defined between the second blade assembly 532*b* and the cap 22.

A skin support element 550 may be affixed to the first blade assembly 532*a*, and in particular, the skin support element 550 may be affixed to, and extend widthwise along, at least a portion of a back surface (not labeled) of the first blade support member 534*a*, which may comprise a leading blade support member. The skin support element 550 extends past the blade support member 534*a* to which the blade 518*a* is coupled and toward the blade tip 518*b*-1 of the adjacent blade assembly 532*b*. The skin support element 550 may optionally comprise a plurality of openings 586, which may be substantially similar to the openings 86 and 286 shown in FIG. 4A and described herein. While only the first blade assembly 532*a* in FIG. 10 is depicted as including a skin support element, it is understood that the second blade assembly 532*b* could also comprise a skin support element (see FIGS. 1-3 and 4A).

The skin support element 550 may comprise a leading section 551 affixed to the blade support member 534*a* and comprising a leading part (not labeled); an intermediate section 552; and a trailing section 553 comprising a trailing part 559. The leading section 551 may extend substantially parallel to the surface of the blade support member 534*a* and may be connected to the intermediate section 552 via a first curved connecting section (not labeled). In particular, the leading section 551 may extend, in a direction from the bottom 29 to the top 27 of the cartridge housing 16 (see FIG. 2), from a leading edge (not labeled) toward the first curved connecting section. The first curved connecting section (not labeled) may curve slightly upward in a direction away from the bottom 29 of the cartridge housing 16 (see FIG. 2) and away from the first blade 518*a*, such that the intermediate section 552 extends in a direction away from the blade tip 518*a*-1 of the first blade 518*a* and substantially perpendicular to the leading section 551. The intermediate section 552 may comprise one or more curved portions. In the example shown in FIG. 10, the intermediate section 552 may comprise a curved portion 552-1 connected to the first curved connecting section and defining an arc that curves in a direction away from the bottom 29 of the cartridge housing 16 and then downward toward the bottom 29 of the cartridge housing (see FIG. 2). The intermediate section 552 may comprise a portion extending between the curved portion 552-1 and the trailing section 553 that is generally planar. At least a portion of the curved and planar portions 552-1 of the intermediate section 552 may define a skin contacting surface. The trailing section 553 may be connected to the generally planar portion of the intermediate section 552 via a second curved connecting section (not labeled).

In FIG. 10, a blade plane may be defined by a line (not shown; see lines 294, 394, and 494 in FIGS. 5 and 7-9) extending tangent to the blade tips 518*a*-1 and 518*a*-2 of the respective blades 518*a* and 518*b*. An outer surface of the curved portion 552-1 of the intermediate section 552 may define a highest point of the skin support element 550, which may be positioned between about 0.13 mm above the blade plane to about 0.07 mm below the blade plane, with a preferred position being at about 0.03 mm above the blade plane. The generally planar portion of the intermediate section 552 may also be positioned between about 0.13 mm above the blade plane to about 0.07 mm below the blade plane and may be lower than the highest point of the skin support element 550, as shown in FIG. 10. In some examples, the blade plane may be substantially coplanar with and/or parallel to a shaving plane (not labeled in FIG. 10; see FIG. 3). At least a portion of the skin support element 550, i.e., the generally planar portion of the intermediate section 552, may extend substantially parallel to the blade plane and/or the shaving plane.

The leading part (not labeled) of the skin support element 550 may be at least partially defined by the first curved connecting section, and the trailing part 559 may be at least partially defined by the trailing section 553. The trailing section 553 may be substantially similar in structure to the trailing section 53 of the skin support element 50 shown in FIGS. 4A and 4B. Because the leading section 551 is affixed to and extends substantially parallel to the surface of the blade support member 334*a*, at least a portion of the trailing section 553 may be substantially parallel to the leading section 551. The trailing part 559 is spaced apart from, i.e., unattached to, the blade support member 534*a* to which the skin support element 550 is affixed. The trailing part 559 is also spaced apart from the blade tip 518*b*-1 of the second blade 518*b* by a distance 580, which may be substantially similar to the distance 80 in FIG. 3. A horizontal length $L_5$ of the skin support element 550 (defined between the leading part and trailing part 559) may be from about 0.40 mm to about 4.5 mm. The horizontal length $L_5$ of the skin support element 550 may be greater than the distance 580 and greater than a length (not labeled in FIG. 10; see FIG. 4B) of the blade 518*a*. One or more parameters of the blade assemblies 532*a* and 532*b* and/or the skin support element 550 may be varied based on, for example, a number and/or spacing of the blade assemblies 532*a* and 532*b*, as described herein in detail.

Figure 11:
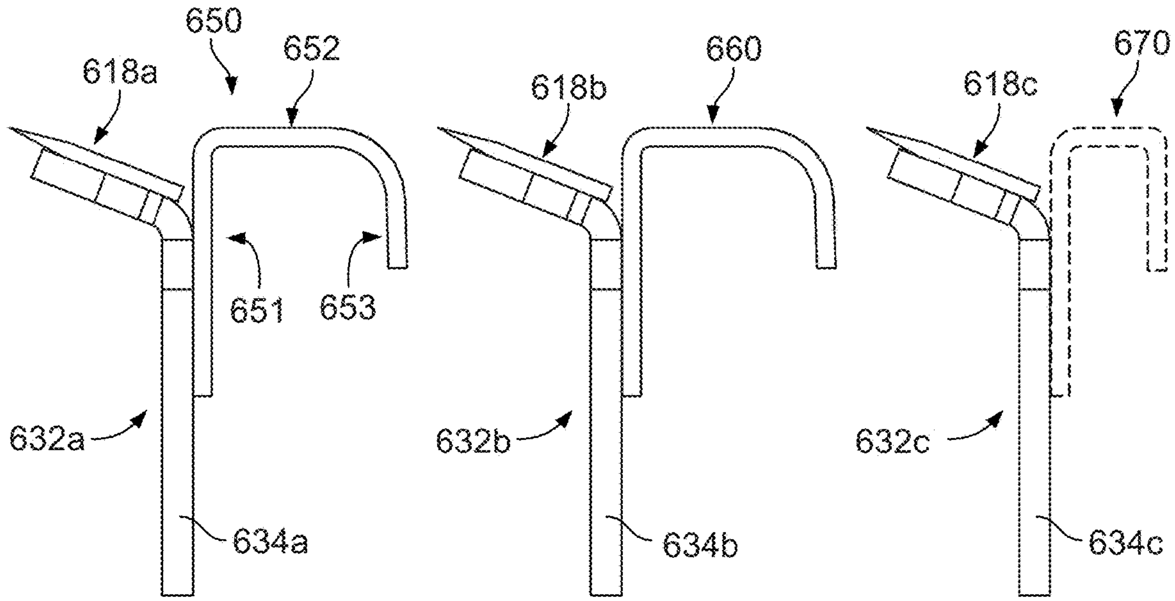
FIG. 11 is a side view of exemplary blade assemblies in accordance with a seventh aspect of the present disclosure.

FIG. 11 is a side view of first, second, and third blade assemblies 632*a*, 632*b*, and 632*c*, which may be substantially similar in structure to the first and second blade assemblies 32*a* and 32*b* in FIGS. 2, 3, 4A, and 4B. Each blade assembly 632*a*, 632*b*, and 632*c* may comprise a respective blade 618*a*, 618*b*, and 618*c* and blade support member 634*a*, 634*b*, and 634*c* coupled to the respective blade 618*a*, 618*b*, and 618*c*, with each blade assembly 632*a*, 632*b*, and 632*c* being mounted to the cartridge housing 16 of the razor cartridge 14 (see FIG. 2). The blade assemblies 632*a* to 632*c* may comprise leading and trailing blades and blade assemblies, as described herein. The blade assemblies 632*a* to 632*c* may be spaced apart from each other. A first interblade span (not labeled) may be defined between a blade tip (not labeled) of the first blade 618*a* and a blade tip (not labeled) of the second blade 618*b*, and a second interblade span (not labeled) may be defined between the blade tip of the second blade 618*b* and a blade tip (not labeled) of the third blade 618*c*, both of which may be from about 2.0 mm to about 5.0 mm. The third blade assembly 632*c* may be adjacent to the cap 22 (see FIGS. 2 and 3), and a gap (not labeled) may be defined between the third blade assembly 632*c* and the cap 22.

A skin support element 650, 660, and 670 may be affixed to a respective one of the blade assemblies 632*a*, 632*b*, and 632*c*, and in particular, the skin support elements 650, 660, and 670 may be affixed to, and extend widthwise along, at least a portion of a back surface (not labeled) of a respective one of the blade support members 634*a*, 634*b*, and 634*c*. The first blade support member 634*a* may comprise a leading blade support member. The skin support elements 650, 660, and 670 extend past the blade support members 634*a* to 634*c* to which the respective blades 618*a* to 618*c* are coupled and toward the blade tip of the adjacent blade assembly 632*b* and 632*c* or the cap 22. The skin support elements 650, 660, and 670 may each optionally comprise a plurality of openings (not visible), which may be substantially similar to the openings 86 and 286 shown in FIG. 4A and described herein.

With continued reference to FIG. 11, the skin support element 650 may comprise a leading section 651 affixed to the blade support member 634*a* and comprising a leading part (not labeled); an intermediate section 652; and a trailing section 653 comprising a trailing part (not labeled). The leading section 651 may extend substantially parallel to the surface of the blade support member 634*a* and may be connected to the intermediate section 652 via a first curved connecting section (not labeled). In particular, the leading section 651 may extend, in a direction from the bottom 29 to the top 27 of the cartridge housing 16 (see FIG. 2), from a leading edge (not labeled) toward the first curved connecting section. The first curved connecting section curves away from the first blade 618*a*, such that the intermediate section 652 extends in a direction away from the blade tip of the first blade 618*a* and substantially perpendicular to the leading section 651. The intermediate section 652 may be generally planar, and at least a portion of the first curved connecting section and the intermediate section 652 may define a skin contacting surface. The trailing section 653 may be connected to the intermediate section 652 via a second curved connecting section (not labeled).

In FIG. 11, a blade plane may be defined by a line (not shown) extending tangent to the blade tips of respective ones of the first and second blades 618*a* and 618*b*. A blade plane (not shown) may similarly be defined for the second and third blades 618*b* and 618*c*. With reference to the skin support element 650, a highest point (not labeled) of the skin support element 650, which may be located along at least a portion of an outer surface of the generally planar intermediate section 652, may be positioned between about 0.13 mm above the blade plane to about 0.07 mm below the blade plane, with a preferred position being at about 0.03 mm above the blade plane. In some examples, the blade plane may be substantially coplanar with and/or parallel to a shaving plane (not labeled in FIG. 11; see FIG. 3). At least a portion of the skin support element 650, i.e., the generally planar intermediate section 652, may extend substantially parallel to the blade plane and/or the shaving plane.

The leading part (not labeled) of the skin support element 650 may be at least partially defined by the leading section 651, and the trailing part may be at least partially defined by the trailing section 653. The trailing section 653 may be substantially similar in structure to the trailing section 53 of the skin support element 50 shown in FIGS. 4A and 4B. Because the leading section 651 is affixed to and extends substantially parallel to the surface of the blade support member 634*a*, at least a portion of the trailing section 653 may be substantially parallel to the leading section 651. The trailing part is spaced apart from, i.e., unattached to, the blade support member 634*a* to which the skin support element 650 is affixed. The trailing part is also spaced apart from the blade tip of the second blade 618*b* by a distance (not labeled), which may be substantially similar to the distance 80 in FIG. 3. A horizontal length (not labeled; defined between the leading and trailing parts) of the skin support element 650 may be from about 0.40 mm to about 4.5 mm. The horizontal length of the skin support element 650 may be greater than the distance between the trailing part and the blade tip of the second blade 618*b* and greater than a length (not labeled in FIG. 11; see FIG. 4B) of the blade 618*a*.

The skin support element 660 may be substantially similar in structure to the skin support element 650. The skin support element 670 may be substantially similar in structure to the skin support elements 650 and 660, but similar to the skin support element 70 in FIGS. 2, 3, and 4A, a horizontal length (not labeled) of the skin support element 670 may be reduced, as compared to the skin support elements 650 and 660, to avoid interference with the cap 22 (see FIG. 3). In the illustrated example, the intermediate section (not labeled) of the skin support element 670 is shortened. In other examples (not shown), the length of the skin support element 670 may be substantially similar to the length of the skin support elements 650 and 660. One or more parameters of the blade assemblies 632*a* to 632*c* and/or the skin support elements 650 to 670 may be varied based on, for example, a number and/or spacing of the blade assemblies 632*a* to 632*c*, as described herein in detail.

Figure 12:
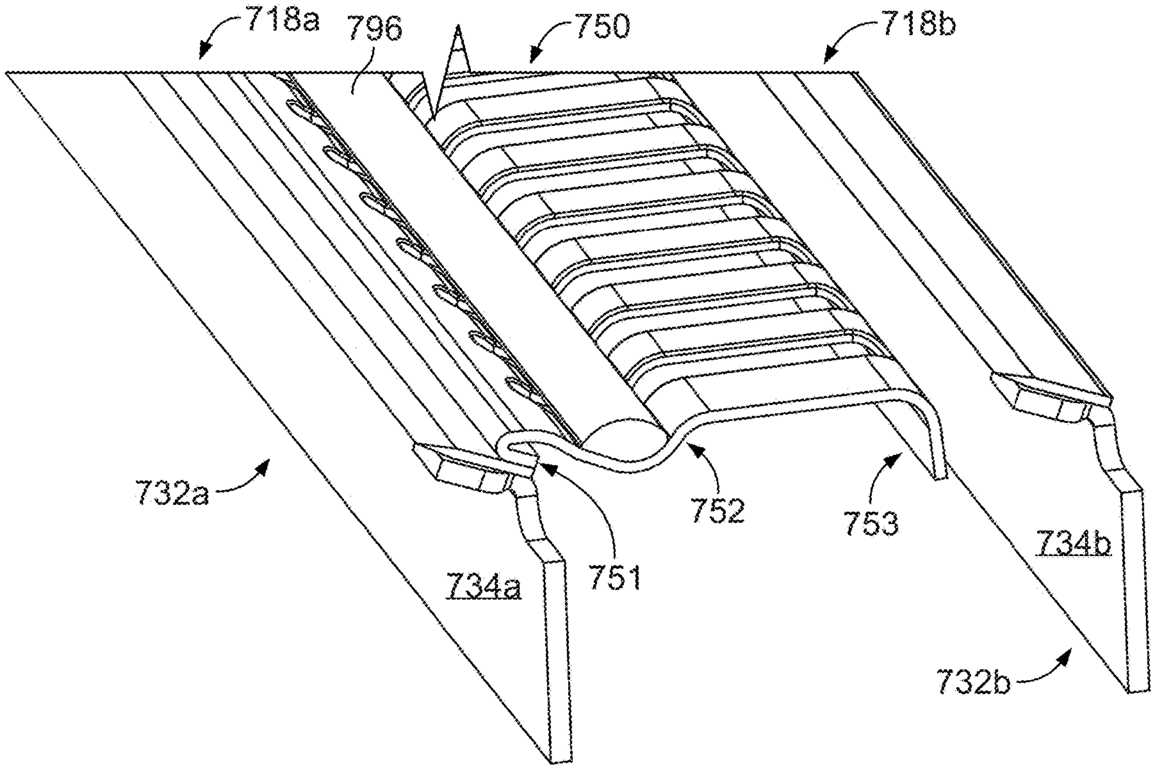
FIG. 12 is a front perspective view of a portion of exemplary blade assemblies in accordance with an eighth aspect of the present disclosure.

FIG. 12 is a perspective view of first and second blade assemblies 732*a* and 732*b*, which may be substantially similar in structure to the blade assemblies 332*a* and 332*b* in FIG. 8. The first blade assembly 732*a* may have a skin support element 750 affixed to it, wherein the skin support element 750 comprises leading, intermediate, and trailing sections 751, 752, and 753. A lubrication member 796 may be mounted to the skin support element 750 and may extend widthwise along at least a portion of the skin support element 750. In particular, the intermediate section 752 of the skin support element 750 comprises one or more curved portions (not labeled; see FIG. 8 and the associated description), and the lubrication member 796 may be located within the first (downward) curved portion of the intermediate section 752. A vertical height of an outer surface (not labeled) of the lubrication member 796 may be at or below a vertical height of the highest point on the first curved connecting section and/or a vertical height of the blade tip (not labeled) of a first blade 718*a* of the first blade assembly 732*a* (see FIG. 8).

Figure 13:
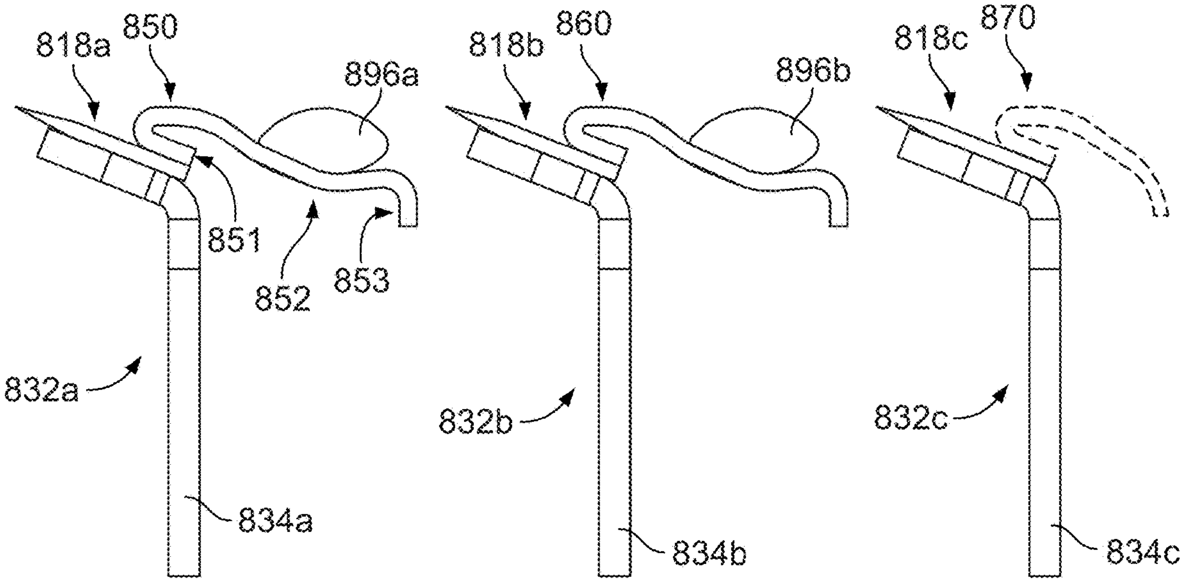
FIG. 13 is a side view of exemplary blade assemblies in accordance with a ninth aspect of the present disclosure.

FIG. 13 is a side view of first, second, and third blade assemblies 832*a*, 832*b*, and 832*c*, which may be substantially similar in structure to the blade assemblies 432*a* to 432*c* in FIG. 9. Each blade assembly 832*a* to 832*c* may have affixed thereto a respective skin support element 850, 860, and 870, and one or more of the skin support elements 850, 860, and 870 may comprise a lubrication member. With reference to the first blade assembly 832*a*, the skin support element 850 may comprise leading, intermediate, and trailing sections 851, 852, and 853, and a lubrication member 896*a* may be mounted to the skin support element 850. In particular, the intermediate section 852 of the skin support element 850 may comprise one or more curved or sloped portions (not labeled; see FIG. 9 and the associated description), and the lubrication member 896*a* may be located within one of the curved or sloped portions of the intermediate section 852. The skin support element 860, which may comprise a structure that is substantially similar to the skin support element 850, may comprise a lubrication member 896*b* that is located within one of the curved or sloped portions of the intermediate section (not labeled) of the skin support element 860. A vertical height of an outer surface (not labeled) of the lubrication members 896*a* and 896*b* may be at or below a vertical height of the highest point on the first curved connecting section and/or a vertical height of the blade tip (not labeled) of a respective blade 818*a* and 818*b* (see FIG. 9).

The lubrication members 796, 896*a*, and 896*b* in FIGS. 12 and 13 may be made using any suitable method, including extrusion, molding, and/or deposition, and may be mounted to the respective skin support element 750, 850, and/or 860 via any suitable means, including adhesive and/or a mechanical interlock, e.g., a snap fit between one or more tabs (not shown) extending outward from the lubrication member and corresponding optional openings (not shown) formed in the skin support element. The lubrication members 796, 896*a*, and 896*b* may be used in place of, or in addition to, the lubrication member 23 in the cap 22 (see FIG. 2).

As described herein, the skin support elements extend toward an adjacent structure, i.e., another blade assembly or the cap. It is believed, without being held to theory, that it is possible to minimize skin irritation and PFB by cutting hair close to skin level, but not below the skin's surface. Multi-blade shaving razor cartridges take advantage of what is known as the hysteresis effect. Hysteresis is the metastable extension of hair that occurs after a hair is cut during shaving. In present day razors, sharp cutting edges of the razor cartridge engage with individual hairs during a shaving stroke, exerting a force on the hairs and causing them to be lifted out of the follicle as the razor is moved across the surface of the skin. Once the hair has been cut and the force is removed, the hair retracts back into the skin. In multi-bladed systems, a consecutive or trailing blade (i.e., a second blade) often engages the hair and cuts it before the hair is able to retract back into the skin, which is known as "hysteresis cutting." If the second and consecutive blades also engage and pull hairs while cutting, it becomes possible to get a significantly closer cut than when using a single blade razor. However, in razor cartridges with multiple, closely spaced blades, the interblade span between the blades may be small, and it is possible that a single hair may be subjected to engagement with more than one blade during a single cutting episode, multiplying the stimulation of the nerve and the sensation of discomfort. In addition, the closely spaced blades may interfere with removal of shaving debris such as cut hair, excess shave prep, and soap from between the blade assemblies.

Blades that are spaced further apart may be less likely to engage the same hair in a single cutting episode and may therefore be less likely to exaggerate nerve stimulation and discomfort. It is believed, without being held to theory, that decreasing the likelihood of single hairs engaging with multiple blades during a cutting episode may reduce uncomfortable nerve stimulation and may also help prevent the hair from being cut too close or below the skin's surface, which may limit growing hair from re-entering the epidermis of the skin. However, as the razor is moved across the surface of the skin, blades with a greater interblade span may allow skin bulge, in which a small portion of the skin enters the gap between the blade assemblies and adjacent structures. Increased skin bulge can result in increased nicks, cuts, and overall discomfort. Thus, many factors must be balanced to obtain a design that achieves a close cut, while minimizing discomfort and damage to the skin.

With reference to the example shown in FIGS. 2, 3, and 4A, the skin support elements 50 and 60 extend toward the respective blade tips 18*b*-1 and 18*c*-1 of the adjacent blade assemblies 32*b* and 32*c* and across at least a portion of the distance between adjacent ones of the blade assemblies 32*a* to 32*c*, i.e., across at least a portion of the respective interblade spans $S_1$ and $S_2$ defined between the blade tips 18*a*-1 to 18*c*-1 of adjacent ones of the first, second, and third blades 18*a* to 18*c*. When present, the skin support element 70 extends toward the cap 22 and across at least a portion of the gap 44 defined between the third blade assembly 32*c* and the cap. The skin support elements 150, 250, 350, 450, 460, 470, 550, 650, 660, 670, 750, 850, 860, and 870 in FIGS. 5-13 similarly extend toward either the respective blade tip of the adjacent blade assembly or toward the cap 22 and across at least a portion of the distance between the blade assemblies and an adjacent structure. In the examples shown, each skin support element may extend past the blade support member to which the skin support element is coupled, and the trailing part of each skin support element may be spaced apart from, i.e., unattached to, the blade support member to which the respective blade is coupled.

Because the skin support elements in accordance with the present disclosure extend across at least a portion of the distance between the blade assemblies and an adjacent structure, skin bulge may be minimized, even for blades with a relatively large interblade span, and the risk of hysteresis cutting of hairs may be reduced. In addition, with continued reference to the example shown in FIGS. 2, 3, and 4A, the skin support elements 50 and 60 may further help to establish proper shaving geometry by positioning the skin for optimal interaction with the blade tip of the next successive blade, which may help to prevent hair form being cut below the skin surface. The skin support elements in FIGS. 5-13 may perform a similar function. Thus, the blade assemblies as disclosed herein may be spaced further apart and/or fewer blade assemblies may be used, while still maintaining comfort during shaving and decreasing the risk of nicks and cuts.

Without the skin support elements 50, 60, and 70, the risk of skin bulge between the blade tips 18*a*-1 to 18*c*-1 of the blades 18*a* to 18*c* may be increased. With reference to FIGS. 3, 4A, and 4B, the skin support elements 50 and 60 bridge a portion of the respective interblade span $S_1$ and $S_2$ and help to smooth the transition between the blades 18*a* to 18*c*. In particular, the skin support elements 50 and 60 help to support the skin as the blades 18*a* to 18*c* move across the surface of the skin and minimize skin bulge, pulling, tugging, pressure, and other uncomfortable sensations. Because the last blade assembly 32*c* in FIGS. 2 and 3 is adjacent to the cap 22, the last blade assembly 32*c* may comprise a shortened skin support element 70 as shown, or may lack a skin support element, as described herein (see FIG. 5, for example). However, skin bulge may still occur if skin enters the gap 44 between the last blade assembly 32*c* and the cap 22, and while nicks or cuts are less likely to occur because there is no successive blade, this skin bulge may still result in tugging and other uncomfortable sensations. Thus, when present, the skin support element 70 on the blade assembly 32*c* adjacent to the cap 22 may similarly serve to support the skin and prevent skin bulge.

With reference to the example shown in FIG. 5, the interblade span $S_{10}$ between the blade tips of the blades 118*a* and 118*b* may be larger than one or both of the interblade spans $S_1$ and $S_2$ defined between the blade tips 18*a*-1 to 18*a*-3 of adjacent ones of the blades 18*a* to 18*c* in FIG. 3. Without the skin support element 150, the risk of skin bulge would be significantly increased due to the larger interblade span $S_{10}$. The skin support element 250 helps to bridge at least a portion of the interblade span $S_{10}$ and supports the skin as the blades 118*a* and 118*b* move across the surface of the skin to minimize skin bulge, pulling, etc. The skin support elements in FIGS. 5-13 similarly help to support the skin and reduce skin bulge.

The position of the skin support element, with respect to the shaving plane and/or the blade plane, may be designed to determine the closeness and/or comfort of the shave. In general, positioning the skin contacting surface and/or highest point or surface of the skin support element below the shaving plane and/or the blade plane may lead to a closer shave, but comfort may be decreased for the reasons described herein. Positioning the skin contacting surface and/or highest point or surface of the skin support element above the shaving plane and/or the blade plane may lead to a more comfortable but less close shave. As described herein, the skin support elements may be positioned such that all or part of the portion(s) of the skin support element that define the skin contacting surface(s) are at, above, or below the shaving and/or the blade plane(s). For example, a highest point or surface of the skin support element may be positioned between about 0.13 mm above the blade plane to about 0.07 mm below the blade plane, with a preferred position being slightly above (about 0.03 mm) the blade plane to facilitate cutting the hair close to, but not below, the skin surface and to relieve some of the pressure of the blade tips on the skin. The position of the skin contacting surface and/or highest point or surface of the skin support element with respect to the shaving plane and/or the blade plane(s) may be varied during the cartridge design process by, for example, altering a vertical position of the blade support member within the blade slot, a position of the blade on the blade support member, a shape of the skin support element, and/or a height and/or radius of curvature of the curved sections/portions of the skin support element.

The trailing part of each skin support element may be spaced apart from an adjacent structure in a horizontal direction, i.e., in a direction parallel to the blade plane, in which the adjacent structure may comprise another blade assembly or the cap. The distance between the trailing part of the skin support element and an adjacent structure may be a minimum of about 0.25 mm and up to about 0.60 mm. This distance may be varied during the cartridge design process as desired by increasing or decreasing the spacing between the blade assemblies and a respective adjacent structure. Alternatively, or in addition, the distance between the trailing part of each skin support element and an adjacent structure may be adjusted as desired by increasing or decreasing a horizontal length of the skin support element.

The skin support elements in accordance with the present disclosure may optionally comprise a plurality of openings that extend through a thickness of the respective skin support element. With reference to FIG. 4A, the skin support elements 50, 60, and 70 each comprise respective openings 86, 88, and 90 formed in and extending through the thickness T of the skin support elements 50, 60, and 70. The openings 86, 88, and 90 may be completely enclosed, i.e., the openings 86, 88, and 90 are spaced away from the leading edges 54, 64, and 74, trailing edges 57, 67, and 77, and side edges (not labeled) of the respective skin support elements 50, 60, and 70. As described herein, the skin support elements of FIGS. 5-13 may similarly comprise a plurality of openings. Although only a single row of openings are shown, it is understood that the plurality of openings may comprise two or more rows of openings. The location, shape, and/or dimension of the openings may be controlled to create access holes for connecting the skin support element to the blade, e.g., by laser welding, adhesive, or other suitable technique.

Because the skin support elements extend across at least a portion of rinse channels formed between adjacent ones of the blade assemblies and/or across at least a portion of a gap between the blade assemblies and an adjacent structure such as the cap, providing one or more openings aids in the removal of shaving debris. The openings may comprise rinse slots that are in fluid communication with respective ones of the rinse channels formed between adjacent ones of the blade assemblies and the gap defined between the last blade assembly and the cap. Without the openings, cut hair, excess shave prep and/or soap, and other shaving debris is able to enter the rinse channels/gap only via the relatively small space between the trailing part of the skin support element and the adjacent structure, which may cause the shaving debris to accumulate on top of the skin support elements and/or blades. The openings allow the shaving debris, along with liquid (e.g., water), to pass through the skin support elements and into the rinse channels/gap, such that the shaving debris may be rinsed out and cleared from the razor cartridge.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor cartridge comprising:

a housing;

a trailing blade assembly mounted to the housing, the trailing blade assembly comprising a trailing blade with a blade tip;

a leading blade assembly mounted to the housing in front of the trailing blade assembly, the leading blade assembly comprising a leading blade with a blade tip; and a skin support element having a leading section affixed to the leading blade assembly, an intermediate section, and a trailing section, the skin support element extending towards the blade tip of the trailing blade assembly, wherein a first length defined between the leading section and the trailing section of the skin support element is greater than a distance from the trailing section of the skin support element to the blade tip of the trailing blade.

2. The razor cartridge of claim 1, wherein the distance from the trailing section of the skin support element to the blade tip of the trailing blade is 0.25 mm to 0.60 mm.

3. The razor cartridge of claim 1, wherein the leading section of the skin support element is affixed to the leading blade.

4. The razor cartridge of claim 3, wherein the leading blade assembly further comprises a leading blade support member, the leading blade is coupled to the leading blade support member, and the skin support element extending past the leading blade support member.

5. The razor cartridge of claim 1, wherein the leading blade assembly further comprises a leading blade support member, the leading section of the skin support element being affixed to the leading blade support member.

6. The razor cartridge of claim 1, wherein an interblade span is defined between the blade tip of the leading blade and the blade tip of the trailing blade.

7. The razor cartridge of claim 6, wherein the interblade span is between 2.0 mm and 5.0 mm.

8. The razor cartridge of claim 1, wherein the leading section comprises a leading edge and extends from the leading edge in a direction toward the blade tip of the leading blade and is connected to the intermediate section via a curved connecting section such that the intermediate section extends in a direction away from the blade tip of the leading blade.

9. The razor cartridge of claim 1, wherein the intermediate section is generally planar.

10. The razor cartridge of claim 1, wherein:

the leading blade comprises a second length defined between the blade tip and a blade rear edge, the first length being greater than the second length.

11. The razor cartridge of claim 1, wherein:

a blade plane is defined between the blade tips of the leading and trailing blades; and at least a portion of the intermediate section extends substantially parallel to the blade plane.

12. The razor cartridge of claim 11, wherein the intermediate section comprises one or more curved portions and the trailing section comprises a trailing edge that is closer to the blade plane than a leading edge of the leading section.

13. The razor cartridge of claim 12, further comprising a lubrication member located within a curved portion of the intermediate section.

14. The razor cartridge of claim 1, wherein:

a blade plane is defined between the blade tips of the leading and trailing blades; and at least a portion of the intermediate section is extends beyond the blade plane.

* * * * *